(12) United States Patent
Kim et al.

(10) Patent No.: US 11,101,545 B2
(45) Date of Patent: Aug. 24, 2021

(54) ANTENNA DEVICE AND ELECTRONIC DEVICE INCLUDING THE SAME

(71) Applicant: Samsung Electronics Co., Ltd., Gyeonggi-do (KR)

(72) Inventors: Jeong-Sik Kim, Gyeongsangbuk-do (KR); Ho-Yeon Kim, Gyeongsangbuk-do (KR); Hyeontae Cho, Gyeongsangbuk-do (KR); Ji-Woo Lee, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 16/003,342

(22) Filed: Jun. 8, 2018

(65) Prior Publication Data
US 2019/0058244 A1 Feb. 21, 2019

(30) Foreign Application Priority Data
Aug. 21, 2017 (KR) .................. 10-2017-0105164

(51) Int. Cl.
| | |
|---|---|
| *H01Q 1/24* | (2006.01) |
| *H01Q 13/10* | (2006.01) |
| *H01Q 5/364* | (2015.01) |
| *H01Q 9/04* | (2006.01) |
| *H01Q 21/28* | (2006.01) |

(52) U.S. Cl.
CPC .............. *H01Q 1/243* (2013.01); *H01Q 5/364* (2015.01); *H01Q 13/10* (2013.01); *H01Q 13/103* (2013.01); *H01Q 9/0421* (2013.01); *H01Q 21/28* (2013.01)

(58) Field of Classification Search
CPC ............................... H01Q 1/243; H01Q 13/10
See application file for complete search history.

(56) References Cited

U.S. PATENT DOCUMENTS

| | | |
|---|---|---|
| 2006/0284778 A1 | 12/2006 | Sanford et al. |
| 2010/0073247 A1 | 3/2010 | Arkko et al. |
| 2011/0241948 A1 | 10/2011 | Bevelacqua et al. |
| 2011/0291896 A1 | 12/2011 | Pascolini et al. |
| 2013/0234901 A1 | 9/2013 | Chang et al. |

(Continued)

OTHER PUBLICATIONS

International Search Report dated Oct. 12, 2018.
European Search Report dated Jul. 3, 2020.

*Primary Examiner* — Graham P Smith
*Assistant Examiner* — Amal Patel
(74) *Attorney, Agent, or Firm* — Cha & Reiter, LLC

(57) ABSTRACT

According to various embodiments, an electronic device comprises a housing comprising: a front surface plate; a rear surface plate spaced apart from the front surface plate opposite thereto; and a side surface member surrounding a space between the front surface plate and the rear surface plate, wherein at least a portion of the side surface member comprises at least one conductive portion disposed between a first nonconductive portion and a second nonconductive portion; at least one wireless communication circuit electrically connected to the conductive portion; a conductive plate disposed in the space, and comprising a slot having a longitudinal direction perpendicular to the conductive portion; a conductor disposed on the conductive plate; and at least one conductive member dividing the slot into a plurality of portions.

20 Claims, 19 Drawing Sheets

(56) References Cited

U.S. PATENT DOCUMENTS

| | | |
|---|---|---|
| 2014/0118198 A1 | 5/2014 | Kawashimo et al. |
| 2014/0266922 A1 | 9/2014 | Jin et al. |
| 2015/0311579 A1* | 10/2015 | Irci .................. H01Q 1/243 |
| | | 343/702 |
| 2016/0192517 A1 | 6/2016 | Tsao |
| 2016/0205229 A1 | 7/2016 | Vincent |
| 2016/0352015 A1 | 12/2016 | Roh et al. |
| 2017/0141820 A1 | 5/2017 | Kim et al. |
| 2017/0309995 A1* | 10/2017 | Kim .................. H01Q 1/44 |

\* cited by examiner

ANTENNA DEVICE AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2017-0105164, filed on Aug. 21, 2017, in the Korean Intellectual Property Office, the disclosure of which is incorporated by reference herein in its entirety.

BACKGROUND

Field

The present disclosure relates to an antenna device and an electronic device including the same.

Description of Related Art

As of the number of function of electronic devices by different manufacturers have become similar, manufacturers are now competing by making the electronic devices slim while more rigid.

At the same time, electronic devices may support various wireless communication services such as long term evolution (LTE), Wireless Fidelity (Wi-Fi), neat field communication (NFC), Bluetooth, or the like. An electronic device may include at least one antenna device for supporting various frequencies of various wireless communication services.

Accordingly, it may be desirable for provide electronic devices that are slim, rigid, and support various wireless communication services.

The above information is presented as background information only to assist with an understanding of the present disclosure. No determination has been made, and no assertion is made, as to whether any of the above might be applicable as prior art with regard to the present disclosure.

SUMMARY

The electronic device may use a conductive plate (for example, a conductive intermediate plate) of a metallic material as an element for increasing rigidity and achieving aesthetic aspects. The conductive plate may use a conductive portion, electrically isolated by at least one nonconductive portion, as an antenna radiator.

The conductive plate may include at least one slot. According to an embodiment, the electronic device may include various conductors disposed therein. For example, such conductors may be disposed to extend from the above-described conductive portion, used as an antenna, to a vicinity of the slot. Therefore, an electric current applied to the conductive portion may induce an image current in the conductive plate. The image current may be abandoned to the slot through the conductor, and an undesired parasitic resonance may be generated.

Various embodiments of the present disclosure provide an antenna device and an electronic device including the same.

Various embodiments of the present disclosure provide an antenna device which is implemented not to influence radiation performance even when a slot is formed on a conductive plate, and an electronic device including the same.

According to various embodiments, an electronic device comprises a housing comprising: a front surface plate; a rear surface plate spaced apart from the front surface plate opposite thereto; and a side surface member surrounding a space between the front surface plate and the rear surface plate, wherein at least a portion of the side surface member comprises at least one conductive portion disposed between a first nonconductive portion and a second nonconductive portion; at least one wireless communication circuit electrically connected to the conductive portion; a conductive plate disposed in the space, and comprising a slot having a longitudinal direction perpendicular to the conductive portion; a conductor disposed on the conductive plate; and at least one conductive member dividing the slot into a plurality of portions.

According to various embodiments, an electronic device comprises a housing comprising: a front surface plate; a rear surface plate spaced apart from the front surface plate opposite thereto; and a side surface member surrounding a space between the front surface plate and the rear surface plate having a rectangular shape, and comprising four side surfaces, at least one of a first nonconductive portion and a second nonconductive portion, and a conductive portion interposed between the first nonconductive portion and the second nonconductive portion on at least one of the four sides; at least one wireless communication circuit electrically connected to the conductive portion; a conductive intermediate plate which is disposed in the space substantially parallel with the front surface plate, wherein, the conductive intermediate plate comprises a slot extending from the conductive portion, said slot having a longitudinal direction substantially perpendicular from the conductive portion; an FPCB which extends from the display, extends from a vicinity of the conductive portion of the side surface member in the longitudinal direction, and comprises a portion interposed between the display and the conductive intermediate plate; and a conductive member attached to the conductive intermediate plate, or is formed between the conductive intermediate plate and the display to divide the slot into a plurality of portions.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
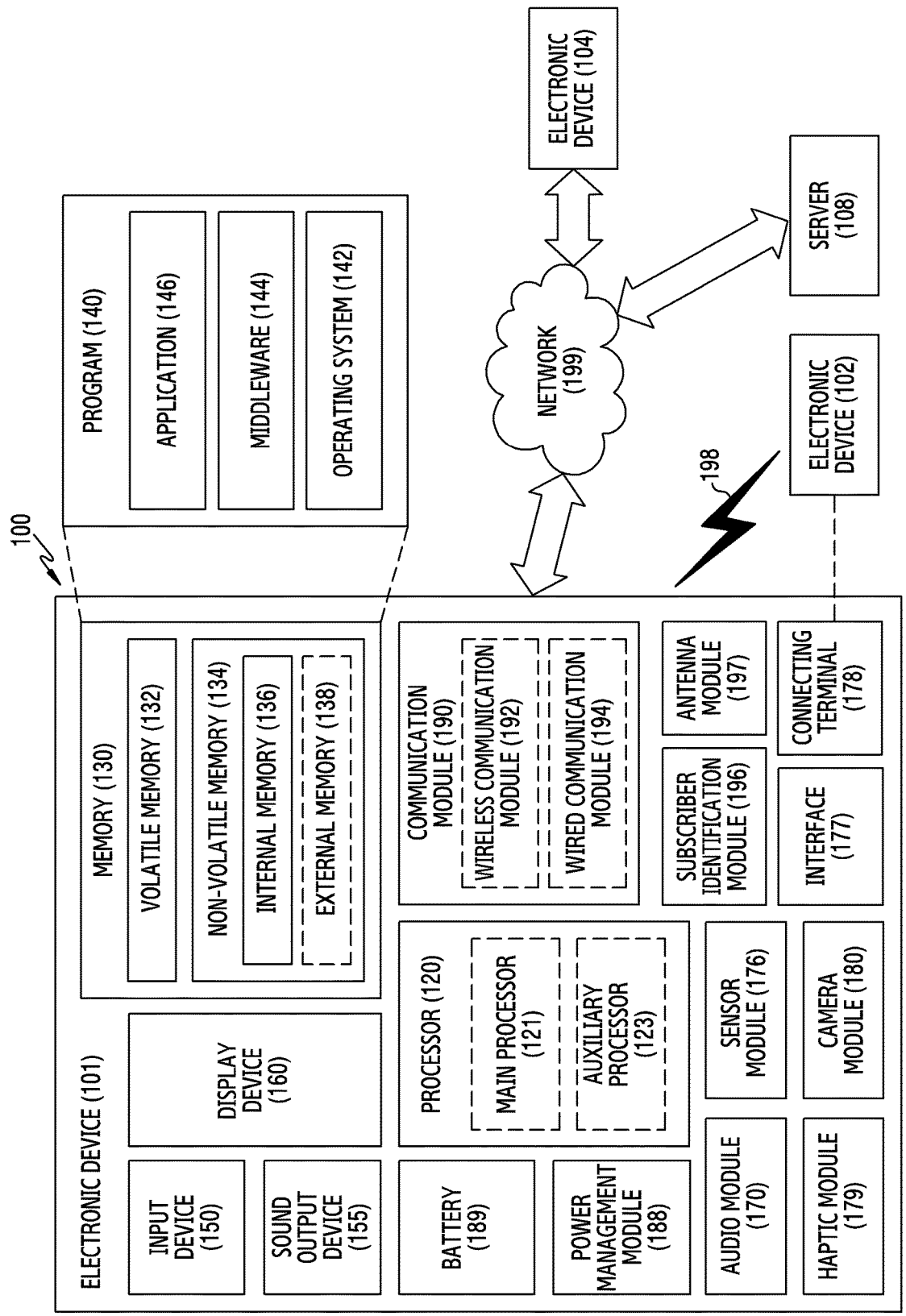
FIG. 1 is a block diagram illustrating an electronic device 101 in a network environment 100 according to various embodiments of the present disclosure.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

Unless otherwise stated or clearly discernable from the context, it shall be understand that the foregoing is non-limiting and only pertains to certain embodiments.

FIG. 1 is a diagram of an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of the functions or states related to at least one component (e.g., the display device 160, the sensor module 176, or the communication module 190) among the components of the electronic device 101, instead of the main processor 121, e.g., while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other components (e.g., the processor 120) of the electronic device 101, from the user of the electronic device 101. The input device 150 may include a microphone, a mouse, or a keyboard.

The sound output device 155 may output sound signals of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to a user of the electronic device 101. The display device 160 may include a display, a hologram device, or a projector and control circuitry to control a corresponding one of the display, hologram device, and projector. The display device 160 may include touch circuitry adapted to detect a touch input, or sensor circuitry (e.g., a pressure sensor) adapted to measure the intensity of force incurred by the touch input.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101, which is to be coupled with the external electronic device 102 directly or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images, and may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101, and the battery 189 may include a primary cell which is not rechargeable, a secondary cell which is rechargeable, or a fuel cell.

The communication module 190 may establish a direct (e.g., wired) communication channel or a wireless communication channel between the electronic device 101 and the electronic device 102, the electronic device 104, or the server 108 and communicate via the established communication channel. The communication module 190 may include one or more communication processors that are operable independently from the processor 120 (e.g., AP) and supports a direct communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as bluetooth (BT)™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the electronic device 101. The antenna module 197 may include one or more antennas for a communication scheme used in the communication network, such as the first network 198 or the second network 199. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

Various embodiments as set forth herein may be implemented as software (e.g., the program 140) including one or more instructions that are stored in a storage medium (e.g., internal memory 136 or external memory 138) that is readable by a machine the electronic device 101. For example, the processor 120 of the electronic device 101 may invoke at least one of the one or more instructions stored in the storage medium, and execute it, with or without using one or more other components under the control of the processor. This allows the electronic device 101 to perform at least one function according to the at least one instruction invoked. The one or more instructions may include a code generated by a compiler or a code executable by an interpreter. The machine-readable storage medium may be provided in the form of a non-transitory storage medium. The term "non-transitory" is defined as a tangible device, and does not include a signal (e.g., an electromagnetic wave), but this term does not differentiate between where data is semi-permanently stored in the storage medium and where the data is temporarily stored in the storage medium.

A method of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
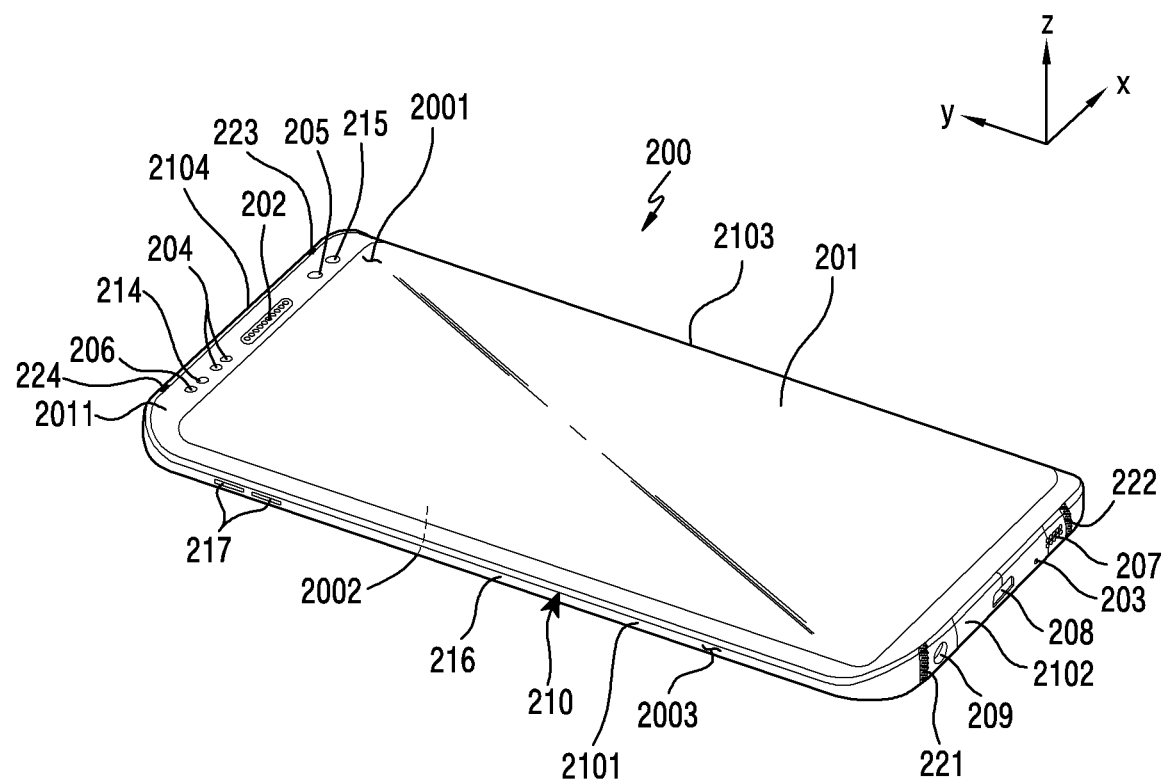
FIG. 2A and FIG. 2B are perspective views illustrating an electronic device according to various embodiments of the present disclosure.
Figure 2B:
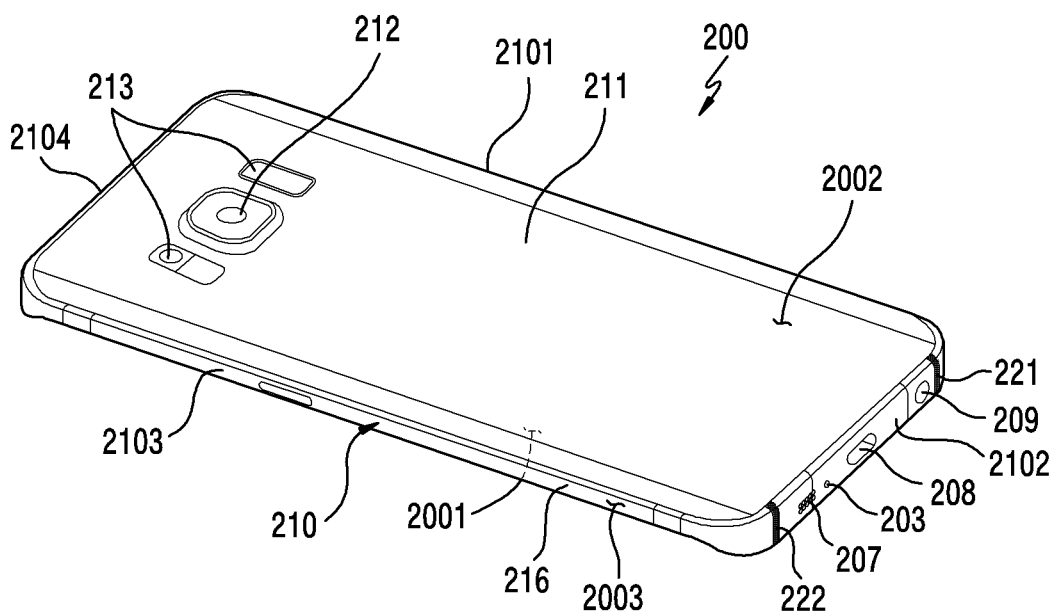

The electronic device 100 is generally placed in a housing. Since the functions of electronic devices 100 among different manufacturers are becoming similar, manufacturers can compete by making the housing thin or slim, and simultaneously rigid, while at the same time, providing the wireless communication services according to numerous different standards, such as the standards described above. FIGS. 2A and 2B are perspective views of an electronic device according to various embodiments of the present disclosure.

FIG. 2A is a front surface perspective view of the electronic device, and FIG. 2B is a rear surface perspective view of the electronic device.

The electronic device 200 of FIGS. 2A and 2B may be similar to the electronic device 101 of FIG. 1 at least in part, or may include other embodiments of the electronic device.

Referring to FIGS. 2A and 2B, the electronic device 200 (for example, the electronic device 101) may including a housing 210. The housing 210 may be formed of a conductive member (see conductive member 313, FIG. 3) and/or a nonconductive member. The housing 210 may include a first surface 2001, a second surface 2002, and a side surface 2003. The first surface (for example, a front surface or a top surface) facing toward a first direction (for example, a Z-axis direction). The second surface 2002 (for example, a rear surface or a bottom surface) is disposed opposite the first surface 2001. The side surface 2003 is disposed to surround at least a portion of the first surface 2001 and the second surface 2002. According to an embodiment, the side surface 2003 may be coupled with a front surface plate 2011 (for example, a glass plate including various coating layers or a polymer plate) and a rear surface plate 211, and may be formed by a side surface member 216 including metal and/or polymer. According to an embodiment, the rear surface plate 211 may be formed from coated or colored glass, ceramic, polymer, metal (for example, aluminum, stainless steel (STS), or magnesium), or a combination of at least two materials of the above-described materials.

The side surface 2003 may be coupled with the front surface plate 2011 and the rear surface plate 211, and may be formed by the side surface member 216 (or a "side surface bezel structure") including metal and/or polymer. The rear surface plate 211 and the side surface member 216 may be integrally formed with each other, and may include the same material (for example, a metallic material such as aluminum or magnesium). According to an embodiment, the side surface member 216 may include a first side surface 2101, a second side surface 2102, a third side surface 2103, and a fourth side surface 2104. The first side surface 2101 can have a first length. The second side surface 2102 can extend substantially perpendicular (or within 5 degrees) to the first side surface 2101 and have a second length. The third side surface 2103 can extend from the second side surface 2102 to have substantially the first length (or within 5%) in parallel (or within 5 degrees) with the first side surface 2101. The fourth side surface 2104 extends from the third side surface 2103 to have substantially the second length (or within 5%) substantially in parallel (or within 5 degrees) with the second side surface 2102.

The second side surface 2102 may have a unit conductive portion 2102 electrically isolated by a pair of nonconductive portions 221, 222 spaced apart from each other by a predetermined distance.

In addition, the fourth side surface 2104 may also have a unit conductive portion 2104 electrically isolated by a pair of nonconductive portions 223, 224 spaced apart from each other by a predetermined distance. The conductive portions 2102 (on the second side surface), 2104, electrically isolated by nonconductive portions 221, 222, and 223, 224 in the direction of the second and fourth side surface, respectively, may be electrically connected with a wireless communication circuit disposed inside the electronic device 200. The conductive portions 2102 and 2104 may be utilized as antennas operating in at least one frequency band.

The electronic device 200 may include on the first surface 2001, the front surface plate 2011 (for example, a window or glass plate) and a display 201 (for example, a touch screen display) exposed through at least a portion of the front surface plate 2011. The display 201 may be coupled with a touch detection circuit, a pressure sensor for measuring an intensity (pressure) of a touch, and/or a pen detection sensor (for example, a digitizer) for detecting a stylus pen of a magnetic field method, or may be disposed adjacent thereto.

The electronic device 200 may include a speaker opening 202 for communication. According to an embodiment, the electronic device 200 may be controlled to use a speaker disposed therein and to listen to the other person through the speaker opening 202 for communication. According to an embodiment, the electronic device 200 may include a microphone opening 203. According to an embodiment, the electronic device 200 may use at least one microphone disposed therein to detect a direction of a sound, and may receive an external sound or to transmit a user's voice to the other person through the microphone opening 203.

The electronic device 200 may include at least one key input device 217. According to an embodiment, the key input device 217 may include at last one side key button 217 disposed on the side surface 2003 of the housing 210. According to an embodiment, the at least one side key button 217 may include a volume control button, a wake-up button, or a specific function (for example, an artificial intelligence execution function or a rapid voice recognition execution mode entering function) performance button.

The electronic device 200 may include components which are exposed through the display 201, or are disposed to perform functions through the front surface plate 2011, but not exposed, and performs various functions of the electronic device 100. At least some of the components may be disposed to be in contact with an external environment from the inside of the electronic device through a portion of the front surface plate 2011 of a transparent material.

The components may include at least one sensor module 204. The sensor module 204 may include, for example, an illuminance sensor (for example, a light sensor), a proximity sensor (for example, a light sensor), an infrared sensor, an ultrasound sensor, a fingerprint recognition sensor, a face recognition sensor, or an iris recognition sensor. In various embodiments, the components may include one or more of a first camera device 205, an indicator 206, a light source 214, an imaging sensor assembly 215. The components may include a first camera device 205. The components may include an indicator 206 (for example, an LED device) for visually providing state information of the electronic device 200 to the user. According to an embodiment, the components may include a light source 214 (for example, an infrared LED) disposed at one side of the speaker opening 202. The components may include an imaging sensor assembly 215 (for example, an iris camera) for detecting an iris image when light generated from the light source 214 is irradiated onto the vicinity of user's eyes. At least one of the components may be disposed to be exposed through at least a portion of the second surface 2002 (for example, a rear surface or a bottom surface) facing toward a direction (for example, the −Z axis direction) opposite the first direction of the electronic device 200.

The electronic device 200 may include an external speaker hole 207. According to an embodiment, the electronic device 200 may use a speaker disposed therein, and may emit a sound through the external speaker hole 207. According to an embodiment, the electronic device 200 may include a first connector port 208 (for example, an interface connector port). The first connector port 208 can exchange data with an external device, and receiving external power to charge a battery of the electronic device 200. The electronic device 200 may include a second connector hole 209 (for example, an ear jack assembly) for receiving an ear jack of an external device.

The electronic device 200 may include the rear surface plate 211 (for example, a rear surface window) disposed on the second surface 2002. According to an embodiment, a rear surface camera device 212 may be disposed on the rear surface plate 211. At least one electronic component 213 may be disposed in the proximity of the rear surface camera device 212. According to an embodiment, the electronic component 213 may include at least one of an illuminance sensor (for example, a light sensor), a proximity sensor (for example, a light sensor), an infrared sensor, an ultrasound sensor, a heartbeat sensor, a fingerprint recognition sensor, or a flash device.

The display 201 may include a touch panel and a display panel which are layered on the rear surface of the front surface plate 2011. An image displayed through the display panel may be provided to the user through the front surface plate 2011 of a transparent material. The front surface plate 2011 may use various materials such as transparent glass or acryl.

The electronic device 200 may include a waterproof structure. The electronic device 200 may include at least one waterproof member (sealing member) disposed therein to perform a hydrophobic function. According to an embodiment, the at last one waterproof member may be disposed between the display 201 and the side surface member 216 and/or between the side surface member 216 and the rear surface plate 211.

The conductive portion 2102 corresponding to the second side surface 2102 of the side surface member 216 may be used as an antenna operating in at least one frequency band. The electronic device 200 may include a conductive plate (for example, a conductive plate 310 of FIG. 3) disposed therein to be extended with the side surface member 216. According to an embodiment, at least one functional slot (for example, a slot 312 of FIG. 3) may be formed on the conductive plate (for example, the conductive plate 310 of FIG. 3). For example, the slot (for example, the slot 312 of FIG. 3) may be applied to receive an enlarged portion of a battery (for example, a battery 360 of FIG. 3) due to a swelling phenomenon. Alternatively, slot 312 may be applied as a receiving space of a removable electronic pen (for example, a stylus pen).

The electronic device 200 may include a conductor (for example, a conductor 322 of FIG. 3) contributing as an inner electronic component, and the conductor may unintentionally correspond to the above-described conductive portion 2102. An image current flow generated in the conductive plate (for example, the conductive plate 310 of FIG. 3) may be interrupted by the slot (for example, the slot 312 of FIG. 3), and a parasitic resonance may be generated. According to an embodiment, the conductor (for example, the conductor 322 of FIG. 3) may include a flexible printed circuit board (FPCB) having a display driver integrated circuit (IC) (DDI) mounted thereon, wherein the FPCB is folded on the rear surface of the display 210 to face the conductive plate (for example, the conductive plate 310 of FIG. 3).

Shifting of the frequency band to an undesired band of the conductive portion 2102 by parasitic resonance may be prevented by inducing a parasitic resonance frequency to operate in a specific band. The parasitic resonance frequency operating in the specific band can be induced by dividing a size of the slot into two portions, (for example, the slot 312 of FIG. 3) by a conductive member. The conductive member increases one of the portions of the slot and reduces the other. Thus, the degradation of the radiation performance of the conductive portion 2102 may be prevented.

Hereinafter, a disposal structure of the above-described slot (for example, the slot 312 of FIG. 3) and the conductive member (for example, the conductive member 313 of FIG. 3) disposed in the slot (for example, the slot 312 of FIG. 3) will be described in detail.

Figure 3:
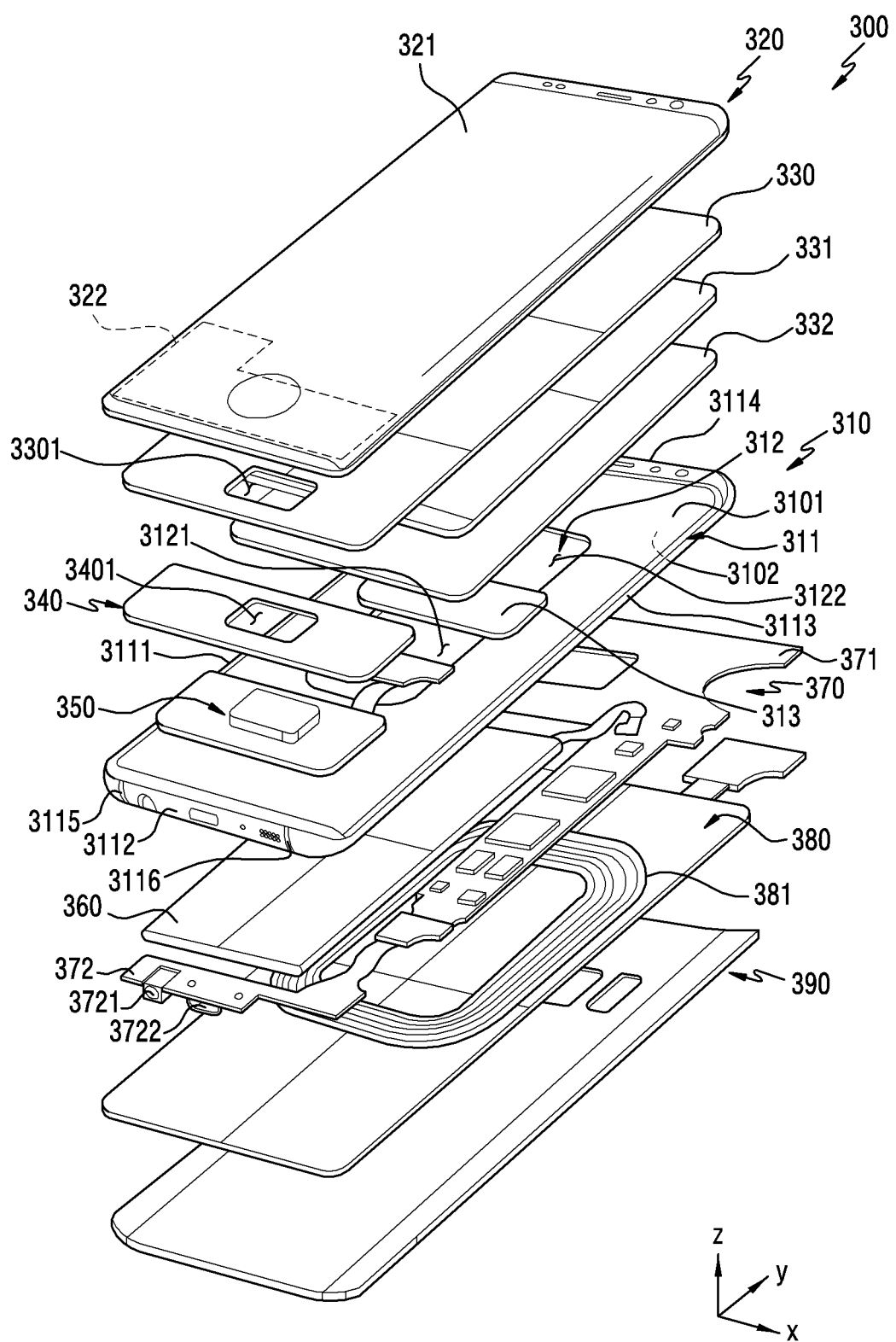
FIG. 3 is an exploded perspective view illustrating an electronic device according to various embodiments of the present disclosure.

FIG. 3 is an exploded perspective view of an electronic device according to various embodiments of the present disclosure.

The electronic device 300 of FIG. 3 may be similar to the electronic device 101 of FIG. 1 or the electronic device 200 of FIG. 2 at least in part, or may include other embodiments of the electronic device.

Referring to FIG. 3, the electronic device 300 may include a housing (for example, the housing 210 of FIG. 2A). According to an embodiment, the housing (for example, the housing 210 of FIG. 2A) may include: a front surface plate 320 including a display 321 (for example, a touch screen display) disposed on a first surface (for example, the first surface 2001 of FIG. 2A) facing toward a first direction (for example, the Z-axis direction); a rear surface plate 390 disposed on a second surface (for example, the second surface 2002 of FIG. 2B) opposite the first surface; and a conductive intermediate plate 310 (hereinafter, a "conductive plate") disposed between the front surface plate 320 and the rear surface plate 390. According to an embodiment, the conductive plate 310 may include: a first surface 3101 facing toward the first direction (for example, the Z-axis direction); a second surface 3102 facing toward a direction (for example, the −Z axis direction) opposite the first surface 3101; and a side surface member 311 surrounding between the first surface 3101 and the second surface 3102.

The side surface member 311 may include: a first side surface 3111 having a first length; a second side surface 3112 extending perpendicular to the first side surface 3111 and having a second length; a third side surface 3113 extending from the second side surface 3112 to have the first length in parallel with the first side surface 3111; and a fourth side surface 3114 extending from the third side surface 3113 to have the second length in parallel with the second side surface 3112. According to an embodiment, the second side surface 3112 may have a unit conductive portion 3112 electrically isolated by a pair of nonconductive portions 3115, 3116 (cut-off portions) spaced apart from each other by a predetermined distance. The conductive portion 3112 electrically isolated may be electrically connected with a wireless communication circuit disposed inside the electronic device 300, and may be utilized as an antenna operating in at least one resonant frequency band.

The electronic device 300 may include a fingerprint recognition sensor 350, a pressure sensor 340, and an electro magnetic resonance (EMR) sensor pad 330 which are disposed between the first surface 3101 of the conductive plate 310 and the display, and a display 321 which is exposed through at least a portion of the front surface plate 320. According to an embodiment, the electronic device 300 may include a conductive film 331 (for example, a CU sheet) and a dielectric film 332 (for example, a double-sided tape) which are disposed between the first surface 3101 of the conductive plate 310 and the display 321. According to an embodiment, the electronic device 300 may include a battery 360, at least one printed circuit board (PCB) 370, a wireless power reception member 380, and the rear surface plate 390 which are disposed on the second surface 3102 of the conductive plate 310.

The fingerprint recognition sensor 350 may receive reflected light by using a light source of the display 321 when a fingerprint contacts the electronic device 300. According to an embodiment, the fingerprint recognition sensor 350 may receive reflected light by using a separate light source. According to an embodiment, the fingerprint recognition sensor 350 may operate in a capacitance method (for example, an active capacitance method or a passive capacitance method), an ultrasound method, or an optical method.

The pressure sensor 340 may operate in the capacitive method and may detect a change in a gap between two electrode layers spaced apart from each other by a dielectric substance by pressure. According to an embodiment, the capacitance method may include a self-capacitance method or a mutual capacitance method.

The EMR sensor pad 330 may be disposed to detect an electronic pen applied as a data inputting means. According to an embodiment, the EMR sensor pad 330 may operate in an electromagnetic induction method to receive a feedback signal generated by a resonant frequency of a coil body provided in the electronic pen. According to an embodiment, the fingerprint recognition sensor 350 may be disposed to overlap the pressure sensor 340 and the EMR sensor pad 330 at least in part. In this case, at least a portion of the fingerprint recognition sensor 350 may be disposed to be in contact with the rear surface of the display 321 through openings 3401, 3301 disposed on corresponding positions of the pressure sensor 340 and the EMR sensor pad 330.

The battery 360 may have a least a portion thereof accommodated in the slot 312 formed on at least a portion of the conductive plate 310, and may be disposed to avoid the at least one PCB 370. According to an embodiment, the slot 312 may be formed to have a size to accommodate a swollen portion of the battery due to the swelling phenomenon of the battery. According to an embodiment, the battery 360 and the at least one PCB 370 may be disposed in parallel with each other without overlapping each other. However, this should not be considered as limiting, and the battery 360 may be disposed to overlap at least a portion of the at least one PCB 370.

According to various embodiments, the at least one PCB 370 may include a main PCB 371 and a sub PCB 372 electrically connected with the main PCB 371. According to an embodiment, the sub PCB 372 may be electrically connected with the main PCB 371 by means of an electric connecting means (for example, a wire cable, an FPCB, or the like). According to an embodiment, the conductive portion 3112 may be electrically connected with the sub PCB 372, and may be electrically connected with the wireless communication circuit mounted on the sub PCB 372 or the main PCB 371. According to an embodiment, the sub PCB 372 may include a first connector hole 3722 (for example, an interface connector port) and a second connector hole 3721 (for example, an ear jack assembly) electrically connected therewith.

According to various embodiments, at least one waterproof member (sealing member) may be disposed between the rear surface plate 390 and the conductive plate 310 and/or between the conductive plate 310 and the front surface plate 320 and/or the display 321. According to an embodiment, the waterproof member may include at least one of a tape, an adhesive, waterproof dispensing, silicon, waterproof rubber, and urethane.

According to various embodiments, the electronic device 300 may include the conductor 322 contributing as an inner electronic component. The conductor 322 may unintentionally correspond to the conductive portion 3112, and an image current flow generated in the conductive plate 310 may be interrupted by the slot 312, and a parasitic resonance may be generated. According to an embodiment, the conductor 322 may include an FPCB having a DDI (for example, a DDI 3221 of FIG. 4B) mounted thereon, wherein the FPCB is folded on the rear surface of the display 321 to face the conductive plate 310. According to an embodiment, an image current induced in the conductive plate 310 may be abandoned to the slot through the conductor 322, and, due to a parasitic resonance generated therefrom, radiation performance of the conductive portion 3112 may be degraded or a resonant frequency band may be shifted to an undesired band.

Shifting of the frequency band to an undesired band of the conductive portion 2102 by parasitic resonance may be prevented by inducing a parasitic resonance frequency to operate in a specific band. The electronic device 300 may include a conductive member 313 disposed to cross over the slot 312 of the conductive plate 310, thereby dividing an opening into two openings. According to an embodiment, the conductive member 313 may be disposed between the conductive plate 310 and the front surface plate 320, and may be disposed by being attached to the first surface 3101 of the conductive plate 310. According to an embodiment, the conductive member 313 may be formed from a metallic material (for example, Cu) in a metal patch form. According to an embodiment, the slot 312 having a length may be divided into two sub slots 3121, 3122 by the conductive member 131 crossing over the slot, and the image current abandoned to the slot through the conductor 322 may be revealed as a resonant frequency of a specific band through electric lengths of the two sub slots 3121, 3122. The parasitic resonance frequency operating in such a specific band may be induced to operate out of a resonant frequency band range of the conductive portion 3112 by the conductive member 313. Accordingly, the conductive portion 3112 of the side surface member 311 can prevent radiation performance from being degraded, by avoiding interference by an undesired parasitic resonance formed by the conductor 322 and the slot 312.

Figure 4A:
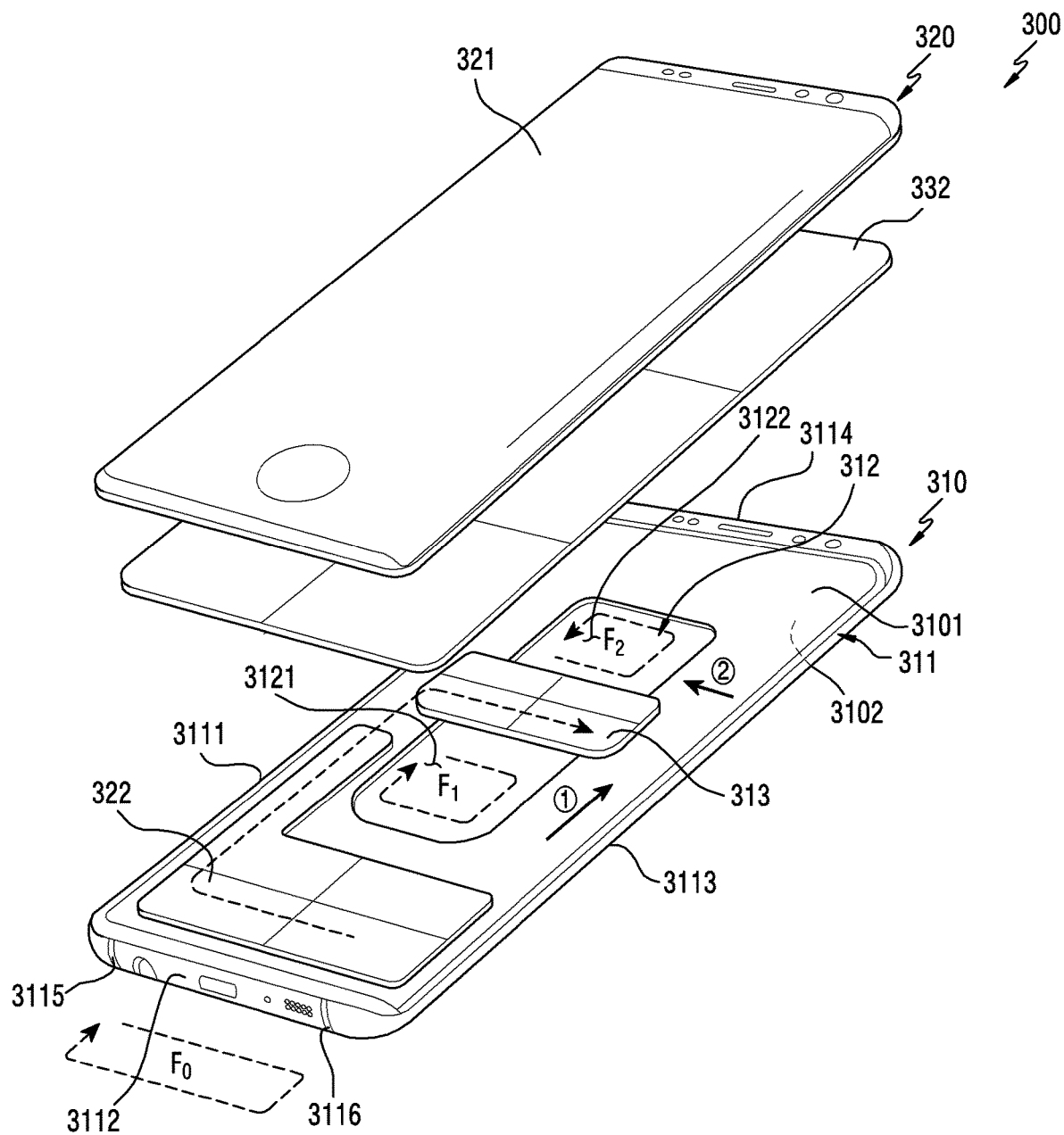
FIG. 4A is a main part perspective view of the electronic device illustrating a state in which a conductive member is disposed on a slot according to various embodiments of the present disclosure.
Figure 4B:
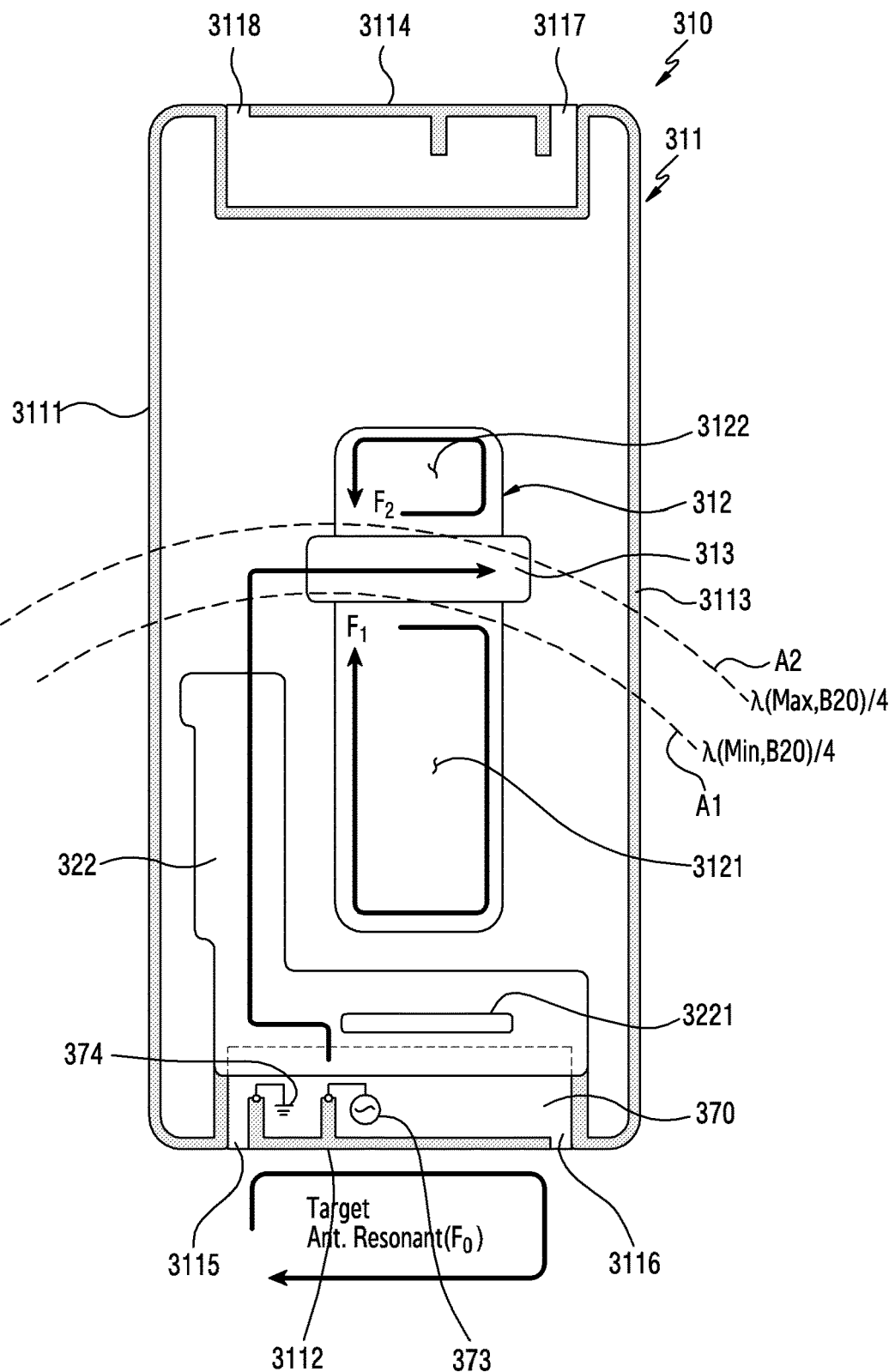
FIG. 4B is a configuration view illustrating the state in which the conductive member is disposed on the slot according to various embodiments of the present disclosure.

FIG. 4A is a main part perspective view of the electronic device illustrating a state in which the conductive member is disposed on the slot according to various embodiments of the present disclosure. FIG. 4B is a configuration diagram illustrating a state in which the conductive member is disposed on the slot according to various embodiments of the present disclosure.

Referring to FIGS. 4A and 4B, conductive member 313 may be move along the length of slot 312, thereby creating two sub-slots 3121 and 3122. Movement of the conductive member 313 along the length of the slot 312 enlarges sub-slot 3121 and reduces sub-slot 3122, or vice versa. The size sub-slot 3121 and 3122 determines the resonant frequency F1 and F2, respectively. The resonant frequency can be adjusted to prevent shifting of the frequency band to an undesired band of the conductive portion 2102.

The electronic device 300 may include the dielectric film 332 and the front surface plate 320 which are disposed on the first surface 3101 of the conductive plate 310 in sequence. The functional slot 312 may be formed on the conductive plate 310 as described above. The slot 312 may be formed to have a length in a direction (for example, a direction of ①) of going away from the conductive portion 3112 disposed between the pair of nonconductive portions 3115, 3116 of the side member 311 of the conductive plate 310. The slot 312 may be formed from the conductive portion 3112 in a longitudinal direction (longitudinal axis) having a length longer than that in the width direction of the electronic device 300. According to an embodiment, the electronic device 300 may include the conductive member 313 disposed to change a parasitic resonance frequency band formed by the slot 312. According to an embodiment, the conductive member 313 may be disposed to cross over the slot 312 in a perpendicular direction (for example, a direction of ②) to the longitudinal direction of the slot 312. According to an embodiment, the conductive member 313 may be disposed by being attached to the first surface 3101 of the conductive plate 310.

According to an embodiment, the conductive member 313 may be disposed by attaching a member of a metallic material in a metal patch form to the first surface 3101 of the conductive plate 310.

A portion of the conductive portion 3112 may be electrically connected with a feeding portion 373 (for example, a wireless communication circuit) disposed on the PCB 370 (for example, a PCB or the like) of the electronic device 300, and the other portion of the conductive portion 3112 may be electrically connected with a ground 374 (for example, a ground of the PCB) of the PCB 370 to contribute as an antenna operating in at least one frequency band (F0). According to an embodiment, the conductor 322 may include various electronic components disposed inside the electronic device 300, and disposed from a vicinity of the conductive portion 3112 to a vicinity of the slot 312 to allow an image current, which is induced in the conductive plate 310 by a current applied from the conductive portion 3112, to be abandoned to the slot 312. According to an embodiment, the conductor 322 may be disposed on the rear surface of the front surface plate 320, and may include an FPCB having a DDI of the display 321 mounted thereon, wherein the FPCB is folded toward the conductive plate 310.

The slot 312 may be divided into a first sub slot 3121 through which a first parasitic resonance frequency F1 is revealed, and a second sub slot 3122 through which a second parasitic resonance frequency F2 is revealed by the conductive member 313 attached to cross over the slot 312. According to an embodiment, an attachment position of the conductive member 313 may be determined according to a quarter wave-length range (λ/4) of the conductive portion 3112 operating as an antenna. According to an embodiment, the conductive member 313 may be attached to the slot 312, such that the first sub slot 3121 which is the closest to the conductive portion 3112 may be positioned within the quarter wave-length range of the conductive portion 3112. To this end, the second sub slot 3122 may be naturally distant from the conductive portion 3112, and a parasitic resonance may not be generated by the second sub slot 3122 or may be induced to be generated in an out-band.

Figure 4C:
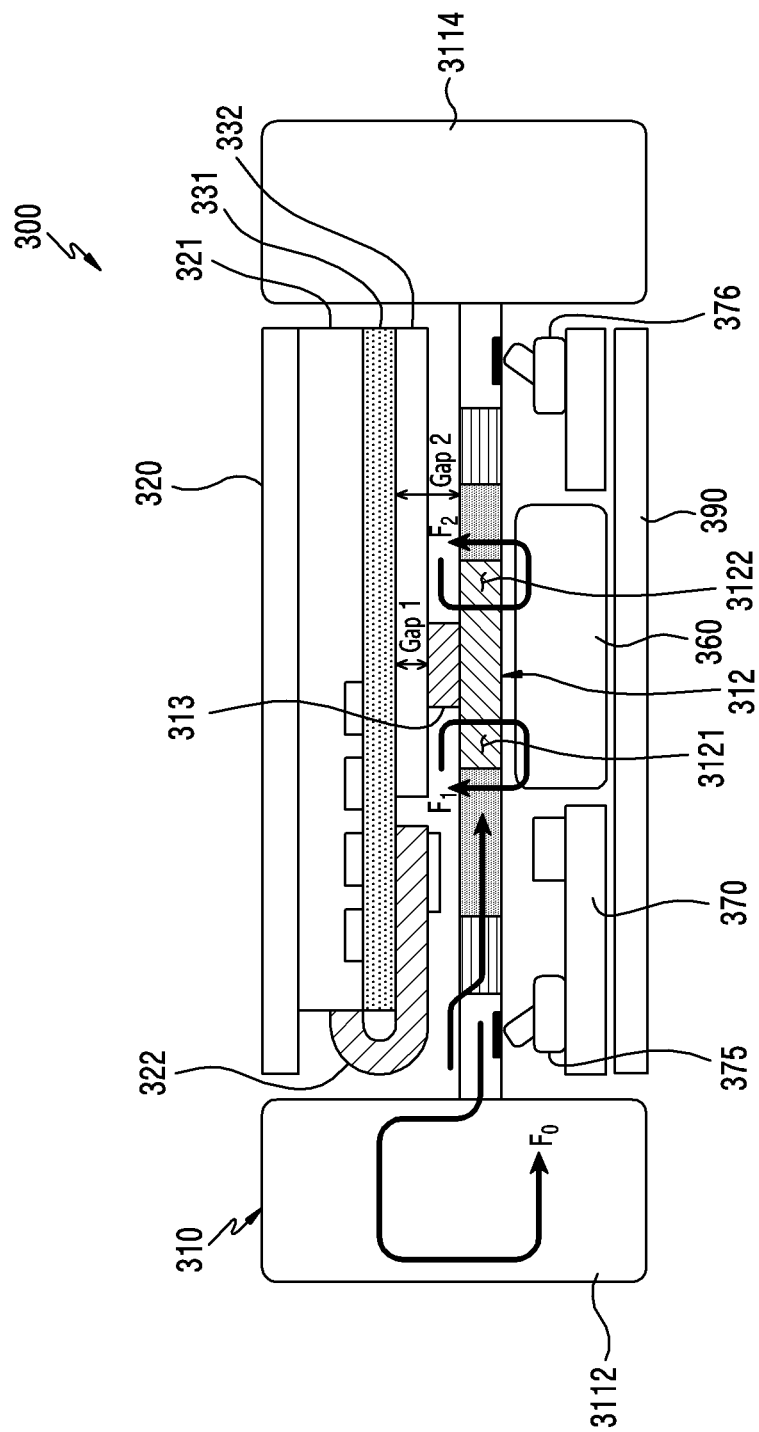
FIG. 4C and FIG. 4D are cross-sectional views illustrating the electronic device according to various embodiments of the present disclosure.

FIG. 4C is a cross-sectional view illustrating the electronic device in an assembled state to explain that a parasitic capacitance increased by the slot is reduced by the conductive member.

Before the conductive member 313 is applied, a first parasitic capacitance may be generated between the rear surface of the display 321 and the conductive plate 310 by a gap GAP 2. When the conductive member 313 is applied to the slot 312, a second parasitic capacitance may be generated between the rear surface of the display 321 and the conductive member 313 by a gap GAP 1. The second parasitic capacitance may be increased in comparison to the first parasitic capacitance, and a parasitic resonance may be reduced by the increased parasitic capacitance. Sub slot 3121 and sub slot 3122 are formed in a plane orthogonal to the drawing.

Figure 4D:
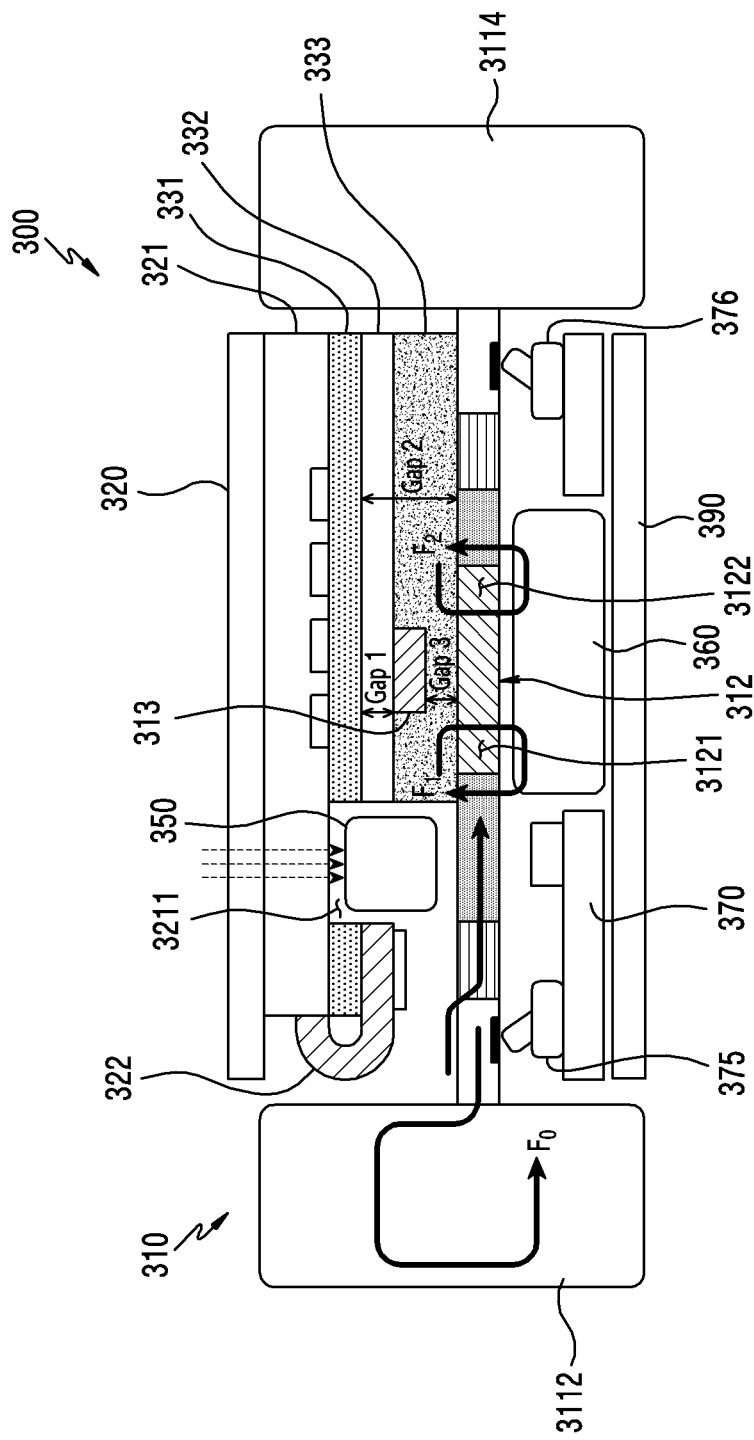

FIG. 4D is a cross-sectional view illustrating the electronic device in an assembled state to explain a spatial relationship of the conductive member when an electronic component (for example, a fingerprint sensor, a pressure sensor, etc.) increasing a gap Gap 2 between the display and the conductive plate is disposed on a corresponding region of the display.

A separate electronic component 350 such as a fingerprint sensor may be interposed between the display 321 and the conductive plate 310, and, when the gap Gap 2 is increased accordingly, a parasitic capacitance between the conductive film 331 and the conductive member 313 may be reduced, and accordingly, the size of a parasitic resonance of the slot 312 may be increased. To prevent such a phenomenon, a dielectric layer 333 of a predetermined thickness may be interposed between the display 321 and the conductive plate 310. According to an embodiment, the dielectric layer 333 may include a double-sided tape having a predetermined thickness. According to an embodiment, the conductive member 313 may be spaced apart from the upper portion of the slot 312 of the conductive plate 310 to enable coupling by the dielectric layer 333, such that the conductive member 313 has a gap Gap 1 enabling coupling with the conductive film 331, and a gap Gap 3 enabling coupling with the conductive plate 310.

Accordingly, the conductive member 313 may divide the slot 312 into the plurality of sub slots 3121, 3122 (the sub slots 3121 and 3122 would be formed in a plane orthogonal to the drawing) through coupling with the slot 312, and simultaneously, may reduce the gap with the conductive film 331, and the parasitic capacitance may increase, and accordingly, the parasitic resonance of the slot 312 may be reduced. For example, when the conductive member 313 supports a low band, a parasitic capacitance of about 39 PF may be generated between the conductive member 313 and the conductive plate 310 to achieve stable coupling, and a parasitic capacitance of about 39 PF may also be generated between the conductive member 313 and the conductive film 331.

Figure 4E:
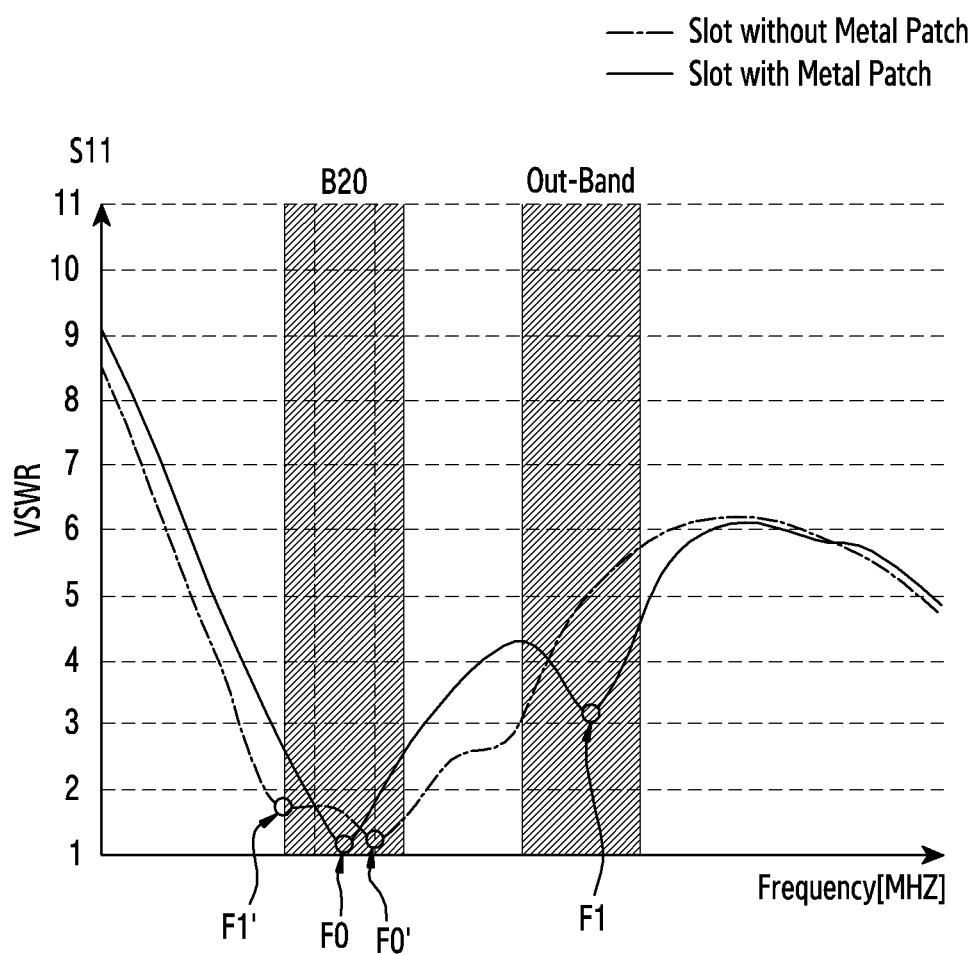
FIG. 4E is a voltage standing wave ratio (VSWR) graph illustrating a state before and after the conductive member is applied to the slot according to various embodiments of the present disclosure.

FIG. 4E is a voltage standing wave ratio (VSWR) graph illustrating a state before and after the conductive member is applied to the slot according to various embodiments of the present disclosure.

Figure 5:
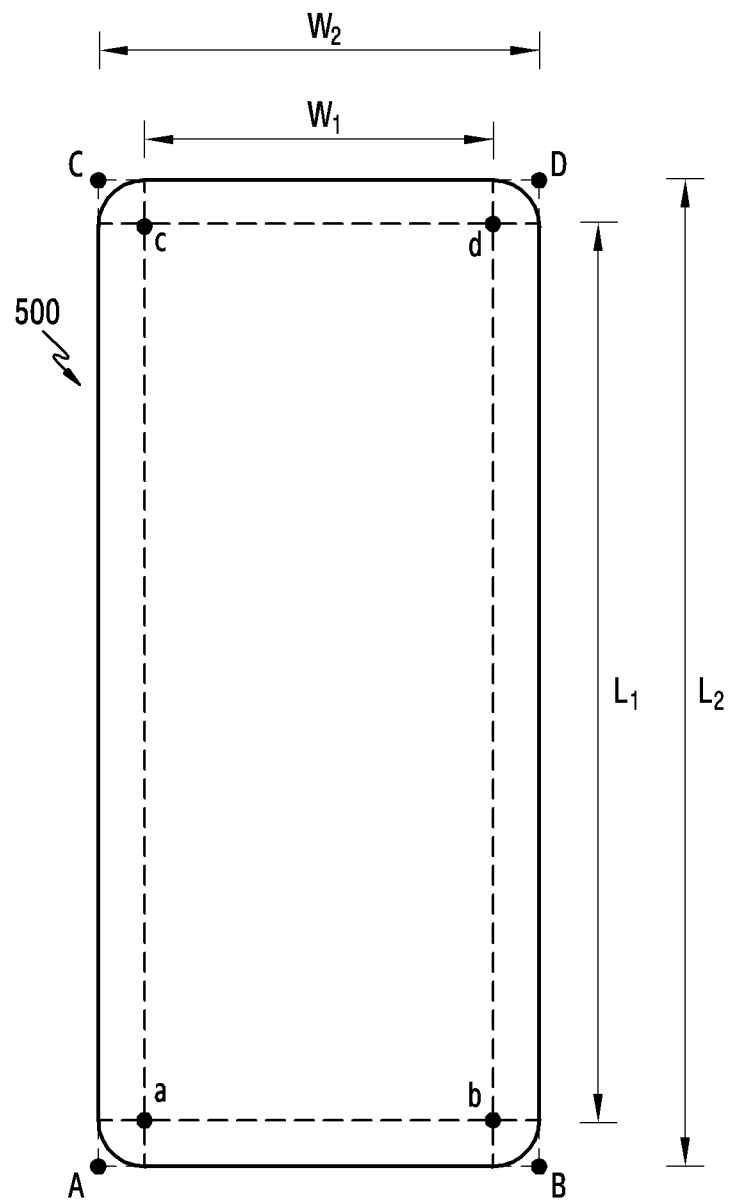
FIG. 5 is a view to illustrate calculating a resonant frequency according to a size of a slot according to various embodiments of the present disclosure.

FIG. 5 is a view to illustrate calculating a resonant frequency according to a size of a slot according to various embodiments of the present disclosure.

A slot 500 of FIG. 5 may be similar to the slot 312 of FIG. 3 at least in part, or may include other embodiments of the slot.

In the following description, a method for calculating an antenna wavelength (λ) of a conductive portion (for example, the conductive portion 3112 of FIG. 4A) and a method for calculating a wavelength of the slot 500 will be described.

According to various embodiments, Equation 1 and Table 1 presented below show an equation for calculating a wavelength of a conductive portion (for example, the conductive portion 3112 of FIG. 4A) in a B20 band, and a wavelength range of the conductive portion (for example, the conductive portion 3112 of FIG. 4A) calculated therefrom:

$$\text{Wave Length } (\lambda) = \frac{\text{Light Velocity } (C)}{\text{Resonant Frequency } (f)} \qquad \text{Equation 1}$$

wherein C is 3×10⁸ m/s

TABLE 1

|  | Downlink (MHz) | | | Uplink (MHz) | | |
| --- | --- | --- | --- | --- | --- | --- |
|  | Low | Middle | High | Low | Middle | High |
| B20 | 791 | 806 | 821 | 832 | 847 | 862 |
| Half(λ/2) | 19 cm | 18.6 cm | 18.2 cm | 18 cm | 17.7 cm | 17.4 cm |
| Quarter(λ/4) | 9.48 cm | 9.3 cm | 9.13 cm | 9 cm | 8.85 cm | 8.7 cm |
| λ/2 Range | | | 17.4-19 cm | | | |
| λ/4 Range | | | 8.7 (Min)-9.48 (Max) cm | | | |

Referring to FIG. 4E, it can be seen that, when the conductive portion 3112 operates in a B20 band (791 MHz-862 MHz), when the conductive member 313 is not applied to the slot 312, a parasitic resonance frequency F1' may be generated in the B20 frequency band, and a main resonant frequency F0' of the conductive portion 3112 is shifted to an undesired frequency band (out-band). Accordingly, antenna radiation performance of the conductive portion 3112 may be degraded.

According to various embodiments, when the exemplary conductive member 313 of the present disclosure is applied to the slot 312, a frequency F0 of the conductive portion 3112 may operate in the best resonant frequency band, and a parasitic resonance frequency F1 is shifted out of the B20 band range. Accordingly, antenna radiation performance of the conductive portion 3112 is not influenced by the parasitic resonance of the slot 312, and the best radiation performance can be maintained.

In exemplary embodiments of the present disclosure, the conductive portion used as an antenna may be formed as a portion of the conductive plate where the slot is formed, but is not limited thereto. For example, at least one antenna may be disposed on a region separate from the conductive plate inside the electronic device, and exemplary embodiments of the present disclosure may be applied when the antenna is under the effect of a parasitic resonance generated as an image current induced through the conductive plate is abandoned to the slot through the conductor.

It can be seen that a minimum distance of the a/4 wavelength in the B20 band in a radiation direction from a feeding portion (for example, the feeding portion 373) of the conductive portion (for example, the conductive portion 3112 of FIG. 4A), calculated through Equation 1, is 8.7 cm, and a maximum distance is 9.48 cm. It is preferable that the conductive member is disposed within a corresponding range of the slot. According to an embodiment, the conductive member may be disposed within 8.7 cm from the feeding portion (for example, the feeding portion 373 of FIG. 4B) of the conductive portion (for example, the conductive portion 3112 of FIG. 4A) in the radiation direction.

Referring to FIG. 5, the method for calculating the resonant frequency of the slot 500 may not exactly obtain the resonant frequency through a physical loop length of the slot 500. This is because the resonant frequency varies according to a material characteristic of the slot, a slot thickness or an ambient material. Accordingly, exemplary embodiments of the present disclosure aim at calculating an approximate resonant frequency of the slot based on information of the width and length of the slot 500 and a slot resonant frequency actually measured. According to an embodiment, the slot 500 has a rectangular shape having corners, and thus, to calculate the resonant frequency, a relative slot loop range may be defined by using an inner rectangle (abcd) and an outer rectangle (ABCD). The inner rectangle (abcd) of the slot may be determined through four virtual points (abcd) at which length sides and width sides except for the corners intersect each other inside the slot, and the outer rectangle (ABCD) may be determined through virtual four points (ABCD) at which length sides and width sides extending from the corners intersect each other outside the slot. To the contrary, when the slot has a rectangular shape, an inner corner rectangle and an outer corner rectangle may be determined by using length sides and width sides of the slot. Bo doing so, the relative slot loop range may be defined. Through this method, the resonant frequency of the slot in the B20 band may be calculated as shown in table 2 presented below:

TABLE 2

| Antenna (B20 λ Range) | 17.4-19 cm (791-860 MHz) |
| Slot #1 Dimensions | W1 = 17.6, W2 = 25.6, |
| (Batt. Swelling) | L1 = 70.7, L2 = 78.7 |
| Relative Slot Loop Range | 176.6(abcd)-208.6 cm (ABCD) |
| Slot Resonant Range | 719-849 MHz (+/−50 MHz) |

Referring to table 2, it can be seen that the slot operating in the B20 band (719 MHz-849 MHz) has the loop range of the inner rectangle of 176.6 cm and the outer rectangle of 208.6 cm. Accordingly, the slot 500 may be designed to have a size to avoid the resonant frequency band of the conductive portion (for example, the conductive portion 3112 of FIG. 4A) without degrading its original function, or a position for dividing the slot 500 by the conductive member (for example, the conductive member 312 of FIG. 4A) may be calculated.

Figure 6:
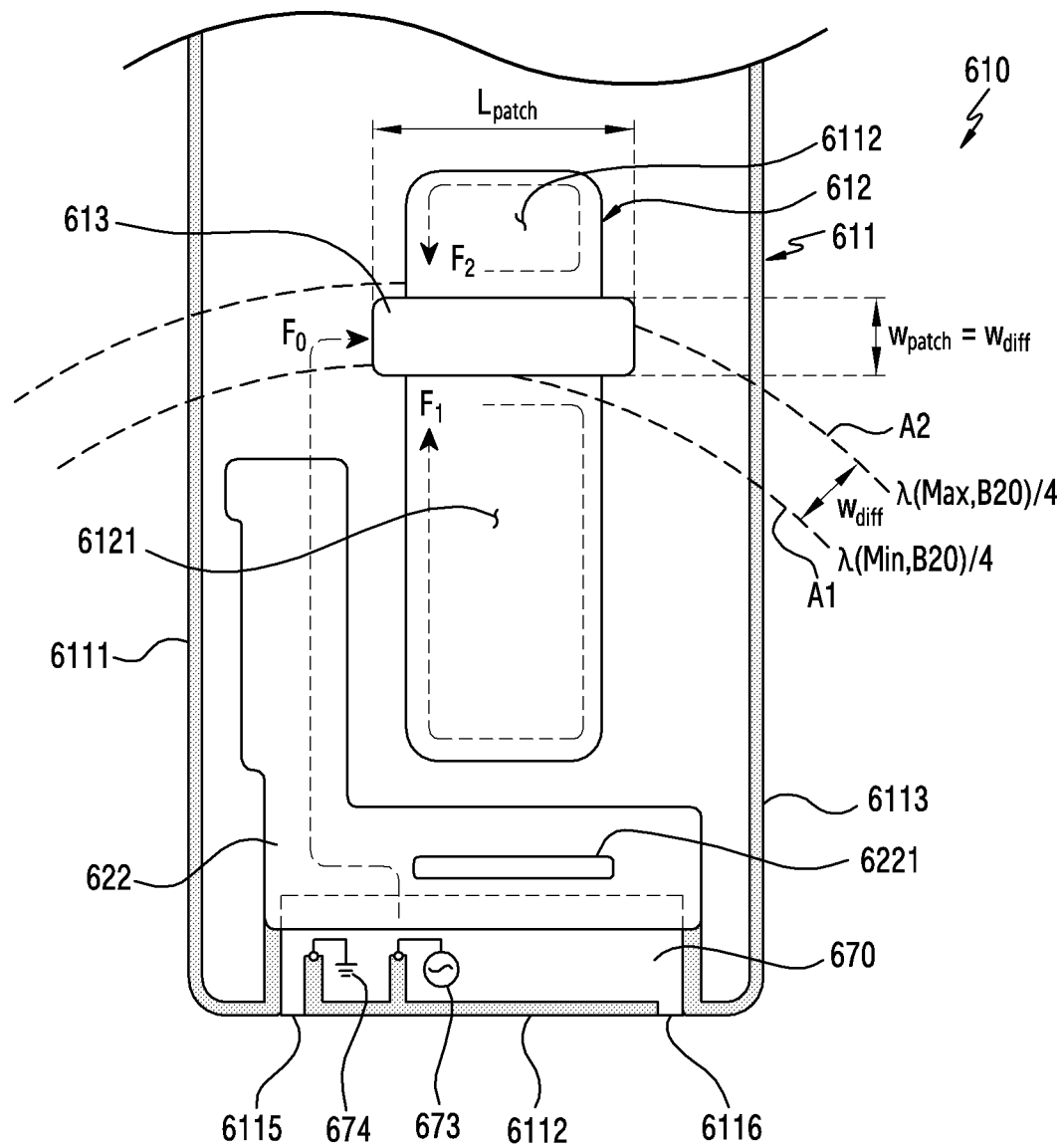
FIG. 6 is a view to illustrate an attachment position of a conductive member to a slot according to various embodiments of the present disclosure.

FIG. 6 is a view to illustrate an attachment position of a conductive member to a slot according to various embodiments of the present disclosure.

A conductive plate 610 of FIG. 6 may be similar to the conductive plate 310 of FIG. 3A at least in part, or may include other embodiments of the conductive plate.

Referring to FIG. 6, the conductive plate 610 may include a side surface member 611. According to an embodiment, the side surface member 611 may include a first side surface 6111, a second side surface 6612, a third side surface 6113, and a fourth side surface (not shown). According to an embodiment, the second side surface 6112 may be formed of a conductive portion 6112 disposed between a pair of nonconductive portions 6115, 6116. According to an embodiment, the conductive portion 6112 may be electrically connected with a feeding portion 673 and a ground 674 disposed on a printed circuit substrate 670 (for example, a PCB) inside the electronic device, and may operate as an antenna.

According to various embodiments, a slot 612 having a predetermined length may be formed on the conductive plate 610, and a conductor 622 (for example, an FPCB) may be disposed from the above-described feeding portion 673 to a vicinity of the slot 612. According to an embodiment, the conductor 622 may include an FPCB having a DDI 6221 mounted thereon, wherein the FPCB is folded on the rear surface of a display (for example, the display 321 of FIG. 4A) to face the conductive plate 610. According to an embodiment, an electric current applied to the conductive portion 6112 from the feeding portion 673 may induce an image current in the conductive plate 610. The image current may be abandoned to the slot 612 through the conductor 622, and an unintended parasitic resonance influencing a resonant frequency band of the conductive portion 6112 may be generated. To solve this problem, a conductive member 613 may be disposed to cross over the slot 612.

According to various embodiments, the conductive member 613 may be disposed on a region of the slot 612 corresponding to a quarter wave-length range (λ/4) of the conductive portion 6112 used as an antenna. According to an embodiment, there may be various directions in which the conductive member 613 is disposed on the slot 613. According to an embodiment, the conductive member 613 may be disposed in a direction perpendicular to the longitudinal direction of the slot 612 with reference to a circular quarter wave-length range (lines A1, A2) from the feeding portion 673 of the conductive portion 6112 in a radiation direction. According to an embodiment, the width of the conductive member 613 may be determined by a difference that is a minimum value (λ(Min, B20)/4) (line A1) subtracted from a maximum value ((Max, B20)/4) (line A2) of the quarter wave-length. According to an embodiment, the length (Lpatch) of the conductive member 613 may be determined by considering an attachment region on the slot 612.

According to various embodiments, the conductive member 613 may be attached to various positions of the slot 612, but an attachment position may be determined such that a loop length of a first sub slot 6121 and a second sub slot 6122 is shorter than the half wave-length range (λ/2) of the conductive portion 6112.

According to various embodiments, the slot may be divided into the first sub slot and the second sub slot by the conductive member. According to an embodiment, the first sub slot 6121 which is the closest to the conductive portion 6112 is positioned within the quarter wave-length range of the conductive portion 6112, and the second sub slot 3122 is naturally distant from the conductive portion 6112, and a parasitic resonance may not be generated by the second sub slot 6122 or may be induced to be generated in an out-band.

Figure 7A:
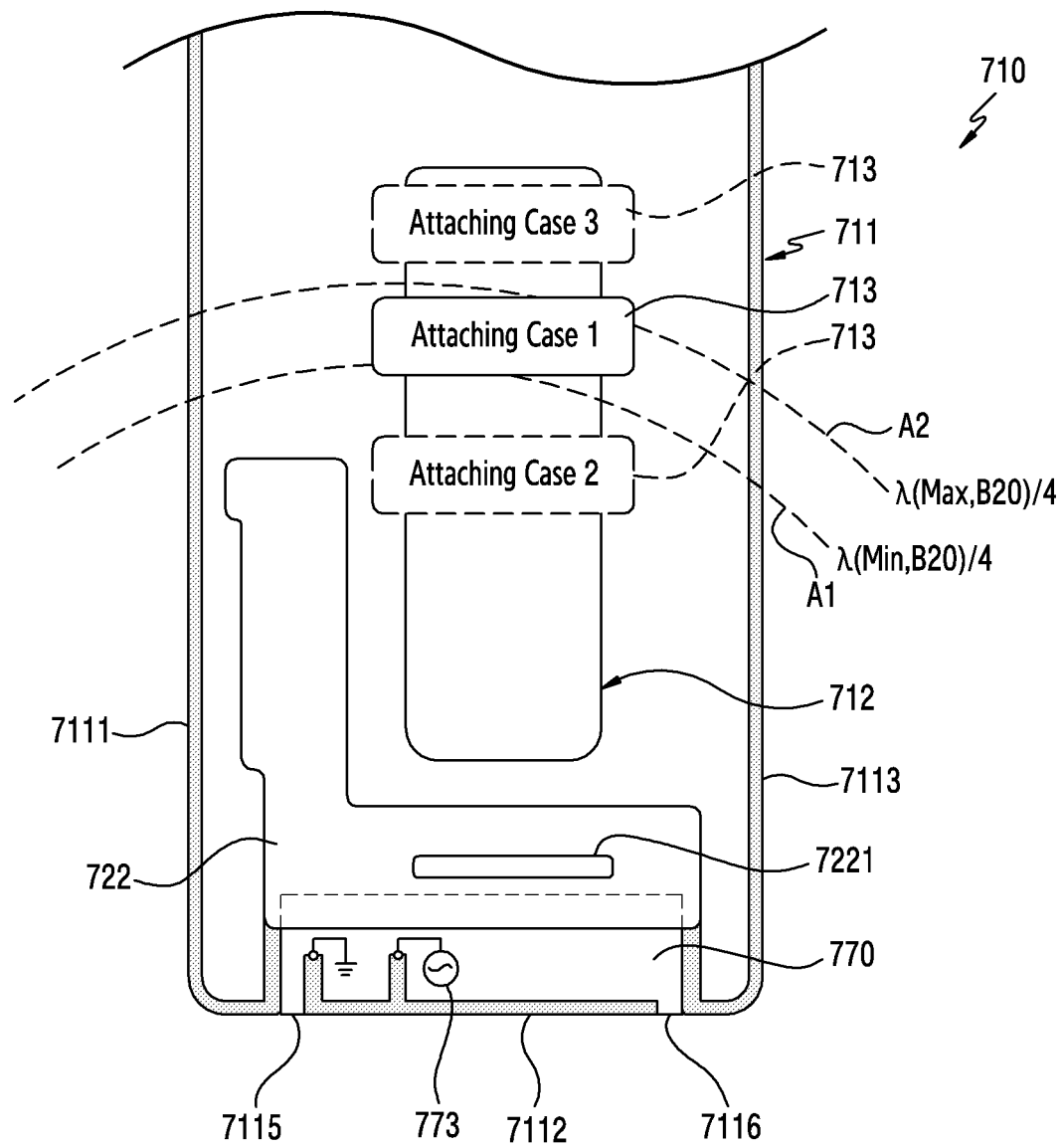
FIG. 7A and FIG. 7B are a view illustrating attachment positions of a conductive member to a slot according to various embodiments of the present disclosure, and a graph illustrating an efficiency resulting therefrom according to frequencies.
Figure 7B:
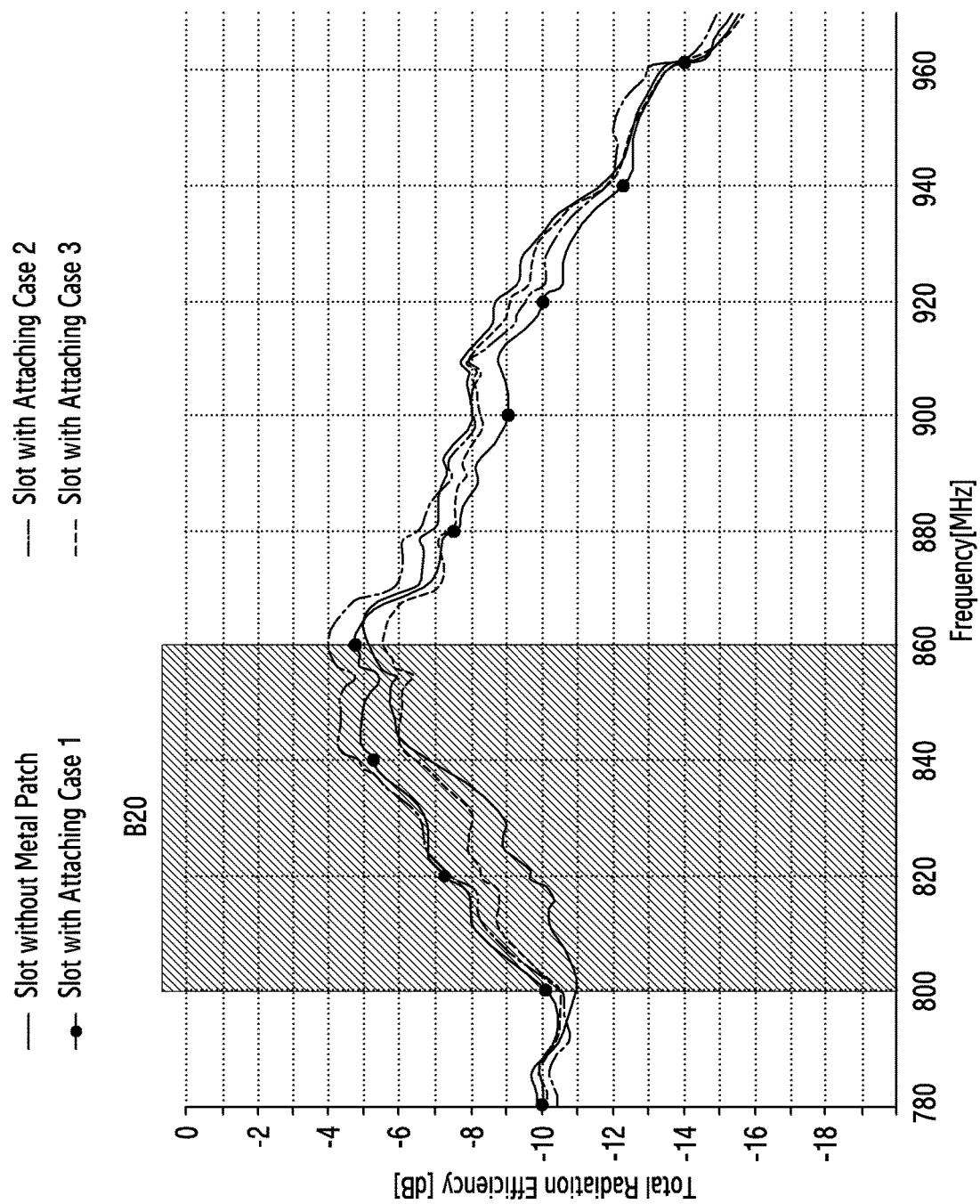

FIGS. 7A and 7B are a view illustrating attachment positions of a conductive member to a slot according to various embodiments of the present disclosure, and a graph illustrating an efficiency resulting therefrom according to frequencies.

A conductive plate 710 of FIG. 7A may be similar to the conductive plate 310 of FIG. 3A or the conductive plate 610 of FIG. 6 at least in part, or may be include other embodiments of the conductive plate.

Referring to FIG. 7A, the conductive plate 710 may include a side surface member 711. According to an embodiment, the side surface member 711 may include a first side surface 7111, a second side surface 7112, a third side surface 7113, and a fourth side surface (not shown). According to an embodiment, the second side surface 7112 may be formed of a conductive portion 7112 positioned between a pair of nonconductive portions 7115, 7116. According to an embodiment, the conductive portion 7112 may be electrically connected to a feeding portion 773 and a ground disposed on a printed circuit substrate 770 (for example, a PCB) inside the electronic device, and may operate as an antenna. According to an embodiment, a conductor 722 may include an FPCB having a DDI 7221 mounted thereon, wherein the FPCB is folded on the rear surface of a display (for example, the display 321 of FIG. 4A) to face the conductive plate 710.

Referring to FIGS. 7A and 7B, antenna performance of the conductive portion 7112 is compared according to attachment positions of a conductive member 713 on a slot 712.

Referring to FIG. 7A, Attaching Case 1 is a case in which the conductive member 713 is disposed within the quarter wave-length range, Attaching Case 2 is a case in which the conductive member 713 is disposed inside the quarter wavelength range, and Attaching Case 3 is a case in which the conductive member 713 is disposed outside the quarter wave-length range.

Referring to FIG. 7B, Attaching Case 1 and Attaching Case 2 show similar antenna efficiencies in an in-band (for example, B20 band) of the conductive portion 7112 except for some regions (840-860 MHz). On the other hand, when the conductive member 7112 is not applied, the lowest efficiency appears in the in-band (790-860 MHz). In addition, in Attaching Case 3 in which the conductive member 713 is attached beyond the quarter wave-length range ($\lambda/4$) of the conductive portion 7112, performance may be slightly enhanced in comparison to the case in which the conductive member 7112 is not provided, but the antenna efficiency is relatively low in comparison to Attaching Case 1 and Attaching Case 2. Accordingly, it can be seen that it is preferable to attach the conductive member within the quarter wave-length range ($\lambda/4$) of the conductive portion according to exemplary embodiments of the present disclosure.

Figure 8:
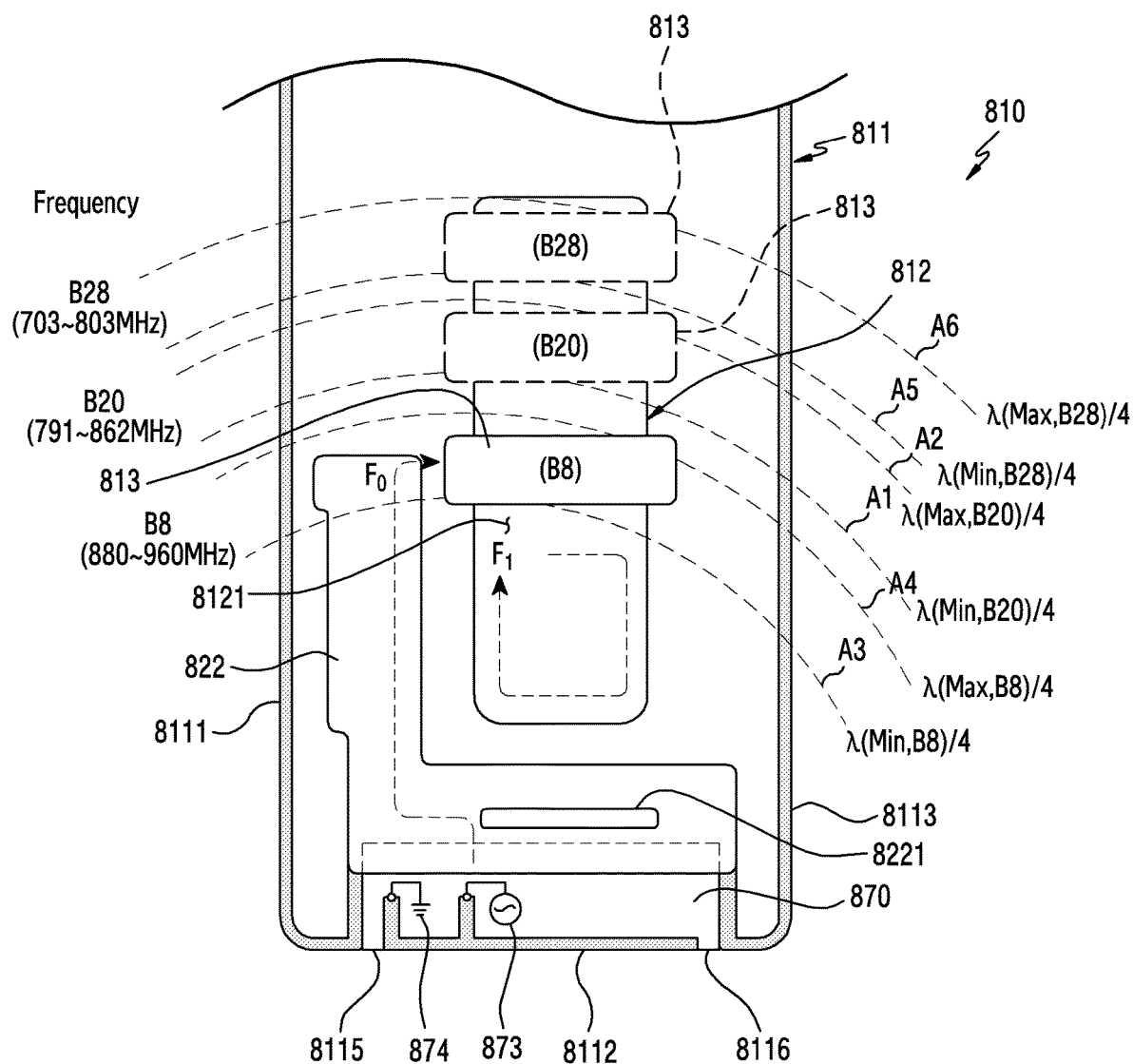
FIG. 8 is a view to illustrate attachment positions of a conductive member to a slot when a conductive portion used as an antenna operates in multi band according to various embodiments of the present disclosure.

FIG. 8 is a view to illustrate attachment positions of a conductive member to a slot when a conductive portion used as an antenna operates in multi-band according to various embodiments of the present disclosure.

A conductive plate 810 of FIG. 8 may be similar to the conductive plate 310 of FIG. 3A, the conductive plate 610 of FIG. 6, or the conductive plate 710 of FIG. 7A at least in part, or may be include other embodiments of the conductive plate.

Referring to FIG. 8, the conductive plate 810 may include a side surface member 811. According to an embodiment, the side surface member 811 may include a first side surface 8111, a second side surface 8112, a third side surface 8113, and a fourth side surface (not shown). According to an embodiment, the second side surface 8112 may be formed of a conductive portion 8112 positioned between a pair of nonconductive portions 8115, 8116. According to an embodiment, the conductive portion 8112 may be electrically connected to a feeding portion 873 and a ground 874 disposed on a printed circuit substrate 870 (for example, a PCB) inside the electronic device, and may operate as an antenna. According to an embodiment, a conductor 822 may include an FPCB having a DDI 8221 mounted thereon, wherein the FPCB is folded on the rear surface of a display (for example, the display 321 of FIG. 4A) to face the conductive plate 810.

According to various embodiments, the conductive portion 8112 may support multi-band to provide an RF diversity and a carrier aggregation (CA) service. For example, when the conductive portion 8112 operates in multi-band such as a B8 band (880 MHz-960 MHz), a B20 band (791 MHz-862 MHz), and a B28 band (703 MHz-803 MHz), an attachment position of a conductive member 813 on a slot 812 may vary as shown in the drawing. In this case, the conductive member 813 may be attached with a minimum size, based on a quarter wave-length range which is calculated with reference to a band using the largest frequency band among in-bands supported by the conductive portion 8112. According to an embodiment, a conductive member having a size of a range covering from the B8 band to the B28 band may be applied as long as there is no limit to the minimum size of the conductive member 813. As shown in the drawing, the conductive member 813 may be disposed on a corresponding region of the slot 812 with reference to the quarter wave-length range regarding the B8 band (880 MHz-960 MHz) which is the highest frequency band.

Figure 9:
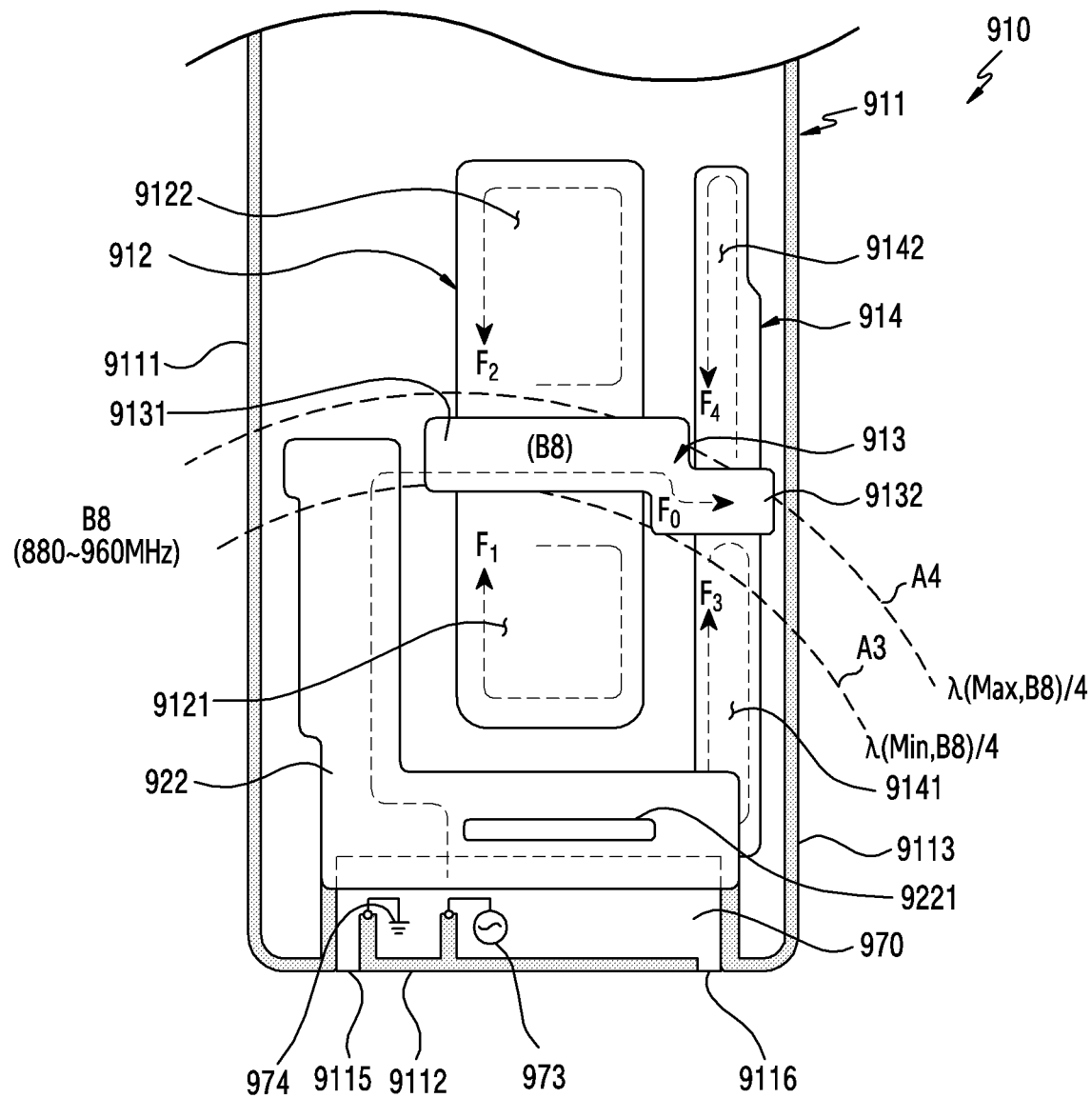
FIG. 9 is a view to illustrate an attachment position of a conductive member to a slot when a plurality of slots are used according to various embodiments of the present disclosure.

FIG. 9 is a view to illustrate an attachment position of a conductive member to a slot when a plurality of slots are used according to various embodiments of the present disclosure.

A conductive plate 910 of FIG. 9 may be similar to the conductive plate 310 of FIG. 3A, the conductive plate 610 of FIG. 6, the conductive plate 710 of FIG. 7A, or the conductive plate 810 of FIG. 8 at least in part, or may be include other embodiments of the conductive plate.

Referring to FIG. 9, the conductive plate 910 may include a side surface member 911. According to an embodiment, the side surface member 911 may include a first side surface 9111, a second side surface 9112, a third side surface 9113, and a fourth side surface (not shown). According to an embodiment, the second side surface 9112 may be formed of a conductive portion 9112 positioned between a pair of nonconductive portions 9115, 9116. According to an embodiment, the conductive portion 9112 may be electrically connected to a feeding portion 973 and a ground 974 disposed on a printed circuit substrate 970 (for example, a PCB) inside the electronic device, and may operate as an antenna. According to an embodiment, a conductor 922 may include an FPCB having a DDI 9221 mounted thereon, wherein the FPCB is folded on the rear surface of a display (for example, the display 321 of FIG. 4A) to face the conductive plate 910.

According to various embodiments, the conductive plate 910 may include a plurality of slots 912, 914. According to an embodiment, the conductive plate 910 may include a first slot 912 and a second slot 914 which is adjacent to the first slot 912. For example, the first slot 912 may be used as a hole in case of a swelling phenomenon of a battery (for example, the battery 360 of FIG. 3) of the electronic device, and the second slot 914 may be used as an electronic pen receiving space of the electronic device. According to an embodiment, even when the first slot 912 and the second slot 914 have different shapes, a parasitic resonance which may interfere with resonant frequency bands B8, B20, B28 of the conductive portion 9112 may be generated by the loop length of each slot.

According to various embodiments, when the first slot 912 and the second slot 914 are adjacent to each other, an integrated conductive member 913 which is deformed into a predetermined shape may be disposed to cross over the first slot 912 and the second slot 914 simultaneously. According an embodiment, the first slot 912 may be divided into a first sub slot 9121 and a second sub slot 9122 by a first portion 9131 of the conductive member 913, and the second slot 914 may be divided into a third sub slot 9141 and a fourth sub slot 9142 by a second portion 9132 extending from the first portion 9131 of the conductive member 913 in a predetermined shape. In this case, the conductive member 913 crossing over the first slot 912 and the second slot 914 may be attached based on a quarter wave-length range (lines A3, A4), which is calculated with reference to a band using the B8 band which is the largest frequency band among the in-bands supported by the conductive portion 9112. However, this should not be considered as limiting, and, when the two slots are spaced apart from each other by a predetermined distance, separate conductive members may be disposed on the slots 912, 914 within the quarter wave-length range of the conductive portion 9112.

Figure 10A:
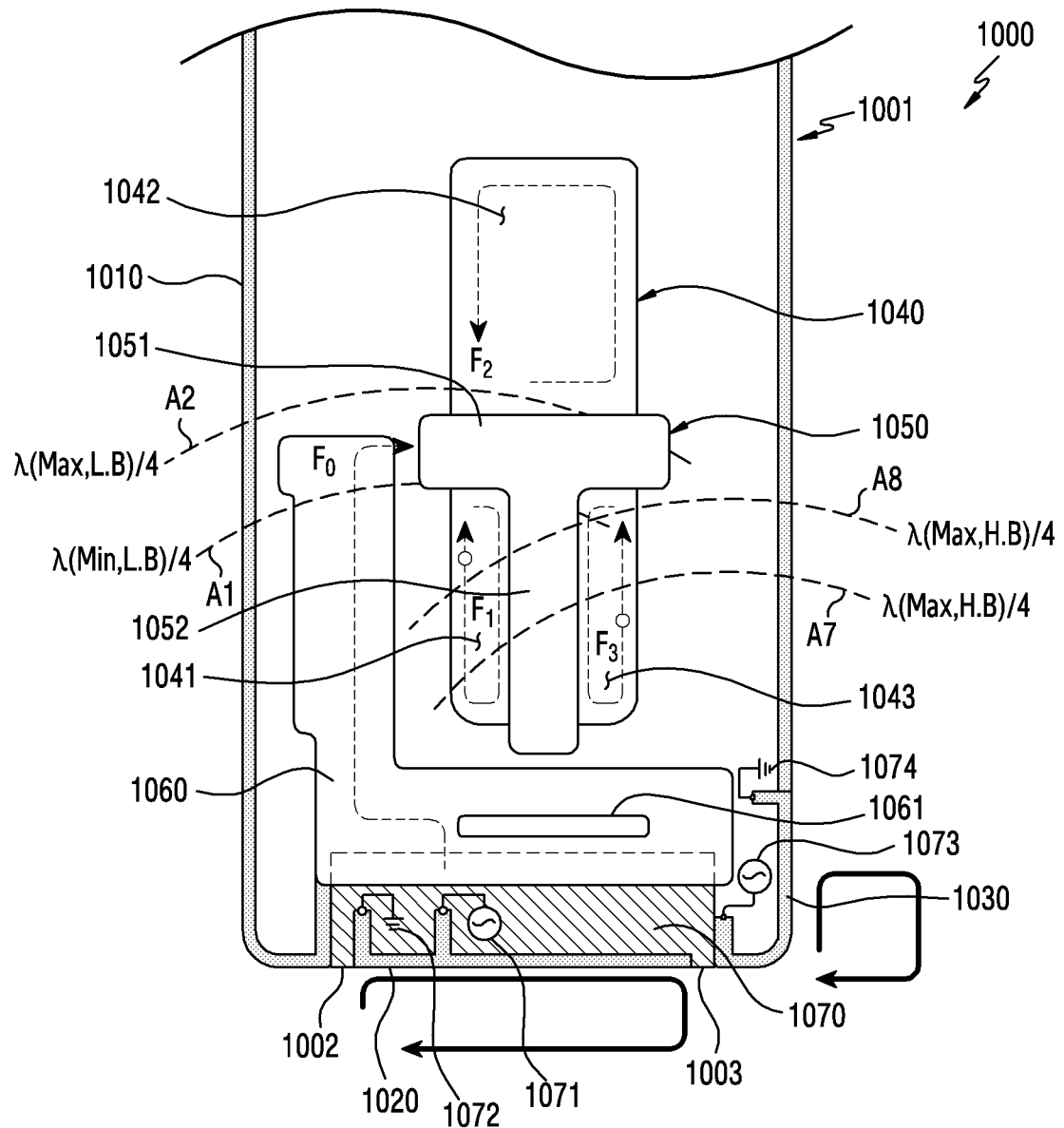
FIG. 10A and FIG. 10B are views to illustrate an attachment position of a conductive member to a slot when a plurality of antennas are used according to various embodiments of the present disclosure.
Figure 10B:
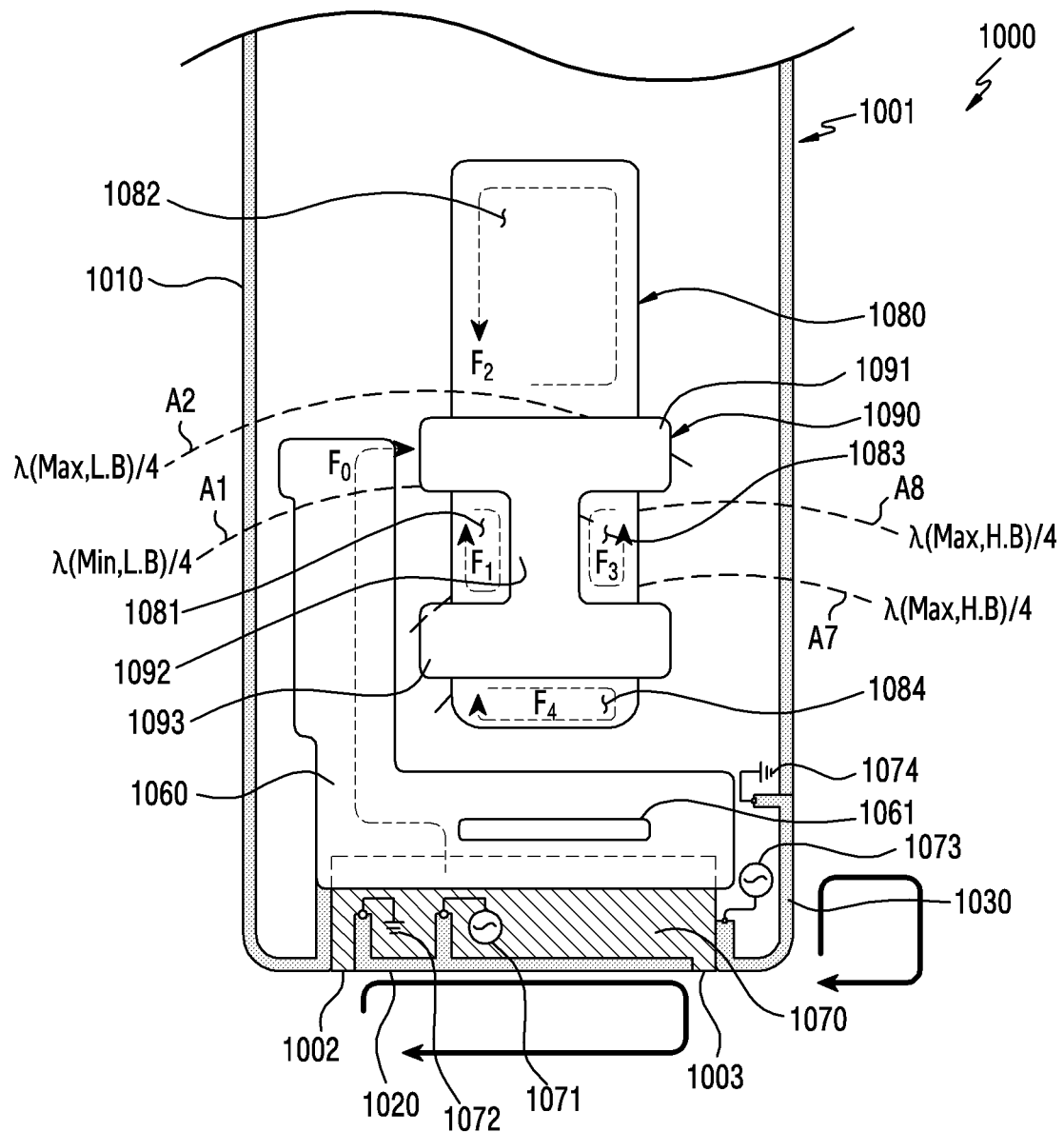

FIGS. 10A and 10B are views to illustrate an attachment position of a conductive member to a slot when a plurality of antennas are used according to various embodiments of the present disclosure.

A conductive plate 1000 of FIG. 10 may be similar to the conductive plate 310 of FIG. 3A, the conductive plate 610 of FIG. 6, the conductive plate 710 of FIG. 7A, the conductive plate 810 of FIG. 8, or the conductive plate 910 of FIG. 9 at least in part, or may be include other embodiments of the conductive plate.

Referring to FIG. 10A, the conductive plate 1000 may include a side surface member 1001. According to an embodiment, the side surface member 1001 may include a first side surface 1010, a second side surface 1020, a third side surface 1030, and a fourth side surface (not shown). According to an embodiment, the second side surface 1020 may be formed of a conductive portion 1020 positioned between a pair of nonconductive portions 1002, 1003. According to an embodiment, the conductive portion 1020 may be electrically connected to a first feeding portion 1071 and a ground 1072 disposed on a printed circuit substrate 1070 (for example, a PCB) inside the electronic device, and may operate as a first antenna. According to an embodiment, a portion of the third side surface 1030 may be electrically connected with a second feeding portion 1073 and a ground 1074, and may operate as a second antenna. According to an embodiment, the conductive portion 1020 operating as the first antenna may operate in a low band, for example, and a portion of the third side surface 1030 operating as the second antenna may operate in a high band. According to an embodiment, a conductor 1060 may include an FPCB having a DDI 1061 mounted thereon, wherein the FPCB is folded on the rear surface of a display (for example, the display 321 of FIG. 4A) to face the conductive plate 1000.

According to various embodiments, a conductive member 1050 may be disposed on a corresponding position of a slot, based on a quarter wave-length range (lines A1, A2) calculated with reference to the low-band supported by the conductive portion 1020 used as the first antenna. However, such a disposal may not cover a quarter wave-length range (lines A7, A8) calculated with reference to the high-band supported by a portion of the third side surface 1030 which is used as the second antenna, and thus a parasitic resonance may be generated. Accordingly, the conductive member 1050 may be disposed on a slot 1040 in a shape covering all of the quarter wave-length ranges (A1, A2, A7, A8) of the antennas.

According to various embodiments, the conductive member 1050 may be formed in a T shape, and may include a first portion 1051 disposed to cross over the slot 1040 in a width direction, and a second portion 1052 extending from the first portion 1051 and disposed to cross over the slot 1040 in a length direction. Accordingly, the slot 1040 may be divided into a first sub slot 1041, a second sub slot 1042, and a third sub slot 1043 by the conductive member 1050, and each slot is disposed on the slot within the quarter wave-length ranges (A1, A2, A7, A8) of the bands supported by the antenna members 1020, 1030, and thus radiation performance can be prevented from being degraded by a parasitic resonance.

Referring to FIG. 10B, a conductive member 1090 may have an "I" shape and may be disposed on a slot 1080 in the same state as in FIG. 10A. According to an embodiment, the conductive member 1090 may include a first portion 1091 disposed to cross over the slot 1080 in the width direction, a second portion 1092 extending from the first portion 1091 in the length direction of the slot 1080, and a third portion 1093 extending from the second portion 1092 to cross over the slot 1080 in the width direction. Accordingly, the slot 1080 may be divided into a first sub slot 1081, a second sub slot 1082, a third sub slot 1083, and a fourth sub slot 1084 by the conductive member 1090, and each sub slot is disposed on the slot within the quarter wave-length ranges (A1, A2, A7, A8) of the bands supported by the antenna members 1020, 1030, and thus radiation performance can be prevented from being degraded by a parasitic resonance.

Figure 11A:
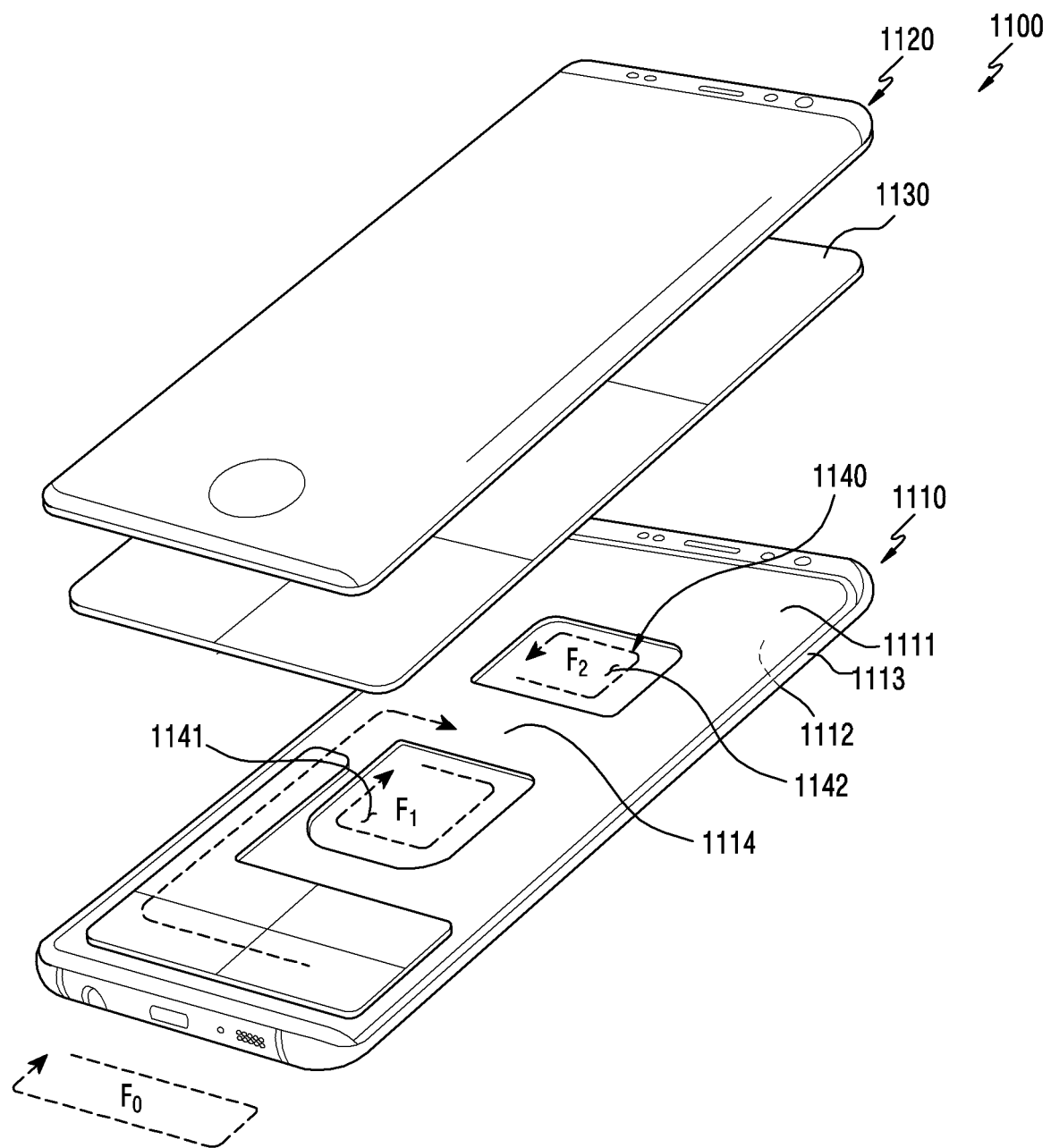
FIG. 11A and FIG. 11B are views to illustrate various slot disposal relationships of a conductive member according to various embodiments of the present disclosure.
Figure 11B:
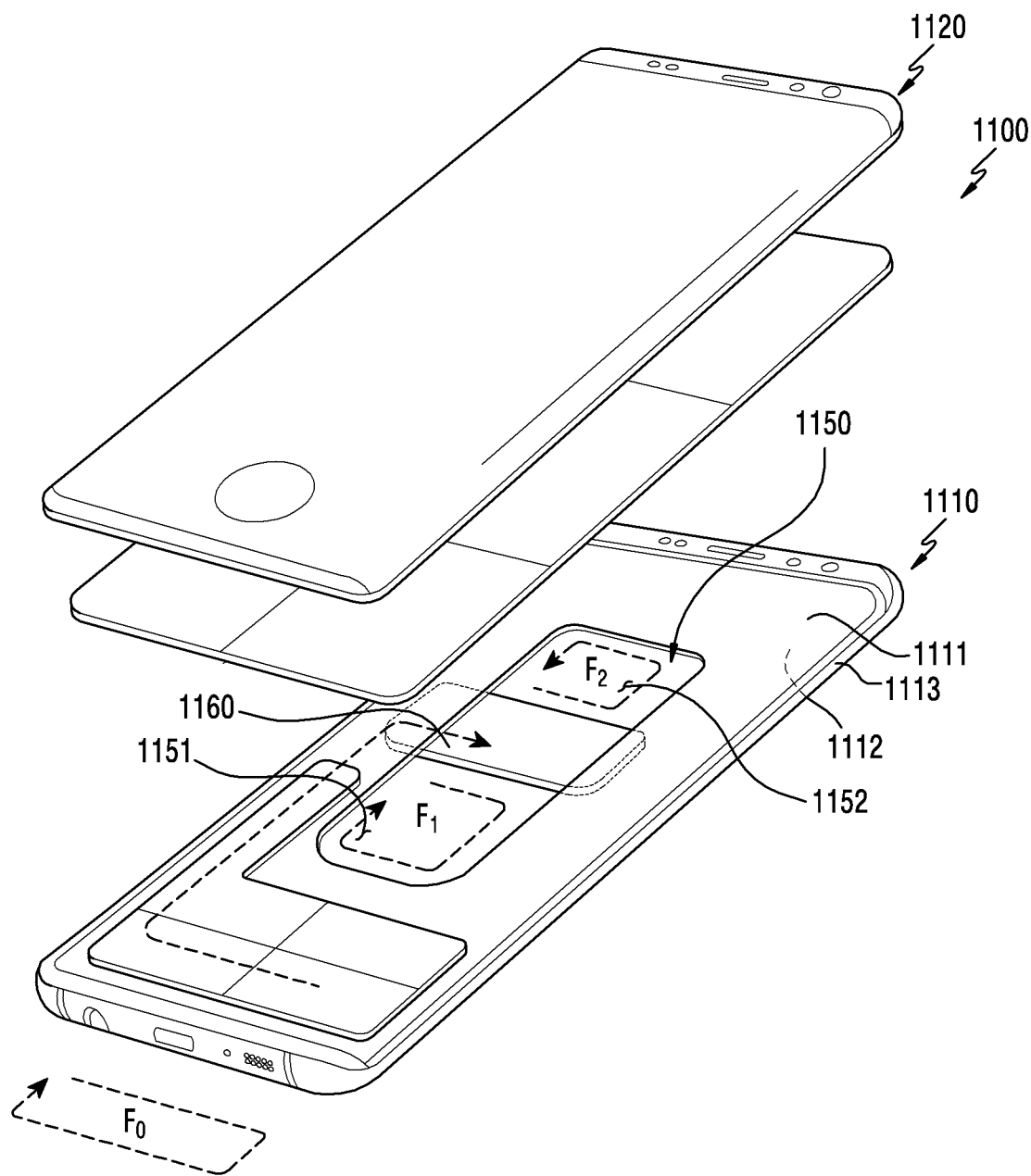

FIGS. 11A and 11B are views showing various slot disposal relationships of a conductive member according to various embodiments of the present disclosure.

An electronic device 1100 of FIGS. 11A and 11B may be similar to the electronic device 101 of FIG. 1, the electronic device 200 of FIG. 2, or the electronic device 300 of FIG. 3 at least in part, or may include other embodiments of the electronic device.

Referring to FIG. 11A, the electronic device 1100 may include a dielectric film 1130 and a front surface plate 1120 which are disposed on a first surface 1111 of a conductive plate 1110 in sequence. According to an embodiment, a slot 1140 may be formed on the conductive plate 1110 as described above.

According to various embodiment, a conductive member 1114 may be integrally formed with the conductive plate 1110 when the conductive plate 1110 is formed, rather than being separately disposed on the conductive plate 1110. According to an embodiment, as shown in the drawings, the conductive member 1114 may extend to have the same height as the first surface 111 of the conductive plate 1110 and a second surface 1112 opposite the first surface 111. However, this should not be considered as limiting. The conductive member 114 may be formed to be lower or higher than the first surface 1111 and the second surface 1112. According to an embodiment, the conductive member 114 may extend toward the front surface plate 1120 to be higher than the first surface 1111, and may reduce a gap with a display (for example, the display 321 of FIG. 3), and increase a parasitic resonance, thereby reducing a parasitic resonance of the slot 1140. According to an embodiment, the conductive member 1114 may extend from the second surface 1112 to be lower than the second surface 1112, and may cover a portion of a battery (for example, the battery 350 of FIG. 3) swelling up by the swelling phenomenon of the battery. Referring to FIG. 11B, a conductive member 1160 may be disposed on the second surface 1112 of the conductive plate 1110.

According to various embodiments of the present disclosure, even when at least one slot is disposed on a conductive plate disposed in an electronic device, the size of the slot is divided in various ways and interference in a resonant frequency band of an antenna device can be avoided, and accordingly, radiation performance can be prevented from being degraded.

According to various embodiments, an electronic device (for example, the electronic device 300 of FIG. 3) may include: a housing (for example, the housing 210 of FIG. 2A) including: a front surface plate (for example, the front surface plate 320 of FIG. 3); a rear surface plate (for example, the rear surface plate 390 of FIG. 3) spaced apart from the front surface plate opposite thereto; and a side surface member (for example, the side surface member 311 of FIG. 3) surrounding a space between the front surface plate and the rear surface plate, wherein at least a portion of the side surface member includes at least one conductive portion (for example, the conductive portion 3112 of FIG. 3) disposed between a first nonconductive portion (for example, the first nonconductive portion 3115 of FIG. 3) and a second nonconductive portion (for example, the second nonconductive portion 3116 of FIG. 3); at least one wireless communication circuit (for example, the wireless communication module 192 of FIG. 1) electrically connected to the conductive portion; a conductive plate (for example, the conductive plate 310 of FIG. 3) disposed in the space, and including a slot (for example, the slot 312 of FIG. 3) having a longitudinal direction perpendicular to the conductive portion; a conductor (for example, the conductor 322 of FIG. 3) disposed on the conductive plate; and at least one conductive member (for example, the conductive member 313 of FIG. 3) dividing the slot into a plurality of portions.

According to various embodiments, a longitudinal direction of the conductive member is perpendicular to the longitudinal direction of the slot.

According to various embodiments, the wireless communication circuit may be configured to transmit and receive a signal within a frequency range in which the conductive portion is used as an antenna.

According to various embodiments, the frequency range may include a range from 700 MHz to 900 MHz.

According to various embodiments, the conductive member may divide the slot into a first sub slot (for example, the first sub slot 3121 of FIG. 3) and a second sub slot (for example, the second sub slot 3122).

According to various embodiments, the conductive member may be disposed on various positions of the slot where the first length is within one-fourth a wavelength, and the wavelength based on a frequency selected from the frequency range.

According to various embodiments, the electronic device may further include a battery (for example, the battery 360 of FIG. 3) wherein at least a portion of the battery is disposed between the slot and the rear surface plate.

According to various embodiments, the at least one conductive portion may operate in multi-band by the wireless communication circuit.

According to various embodiments, the conductive member may be disposed on various positions of the slot where an electric length of the slot is within λ/4, wherein λ is a wavelength of a highest frequency.

According to various embodiments, the conductor may extend from the display, may extend from a vicinity of the conductive portion in the first direction, and may include an FPCB interposed between the display and the conductive plate.

According to various embodiments, the at least one conductive portion may be configured to have different feeding positions according to different bands, and the conductive member may be disposed on various positions of the slot where a length of the slot is within approximately one-fourth of a wavelength of a frequency supported by each conductive portion in a radiation direction from each different feeding position.

According to various embodiments, the conductive member may be separately disposed on a position of the slot corresponding to each conductive portion, or may be integrally formed on positions of the slot corresponding to each conductive portion.

According to various embodiments, at least one additional slot may further be formed in a vicinity of the slot, and the conductive member may be individually disposed on various positions of the slot where a length of the slot is approximately one-fourth of a wavelength of a frequency support by the at least one conductive portion, or may be integrally formed at a position corresponding to each slot.

According to various embodiments, the display may further include a conductive film disposed on a rear surface thereof, and the conductive member may be spaced to be close to the conductive film increasing a parasitic capacitance with the conductive film.

According to various embodiments, the conductive member may be spaced apart from the conductive plate by a dielectric layer (for example, the dielectric layer 333 of FIG. 4D) disposed on the conductive plate.

According to various embodiments, the conductive member may be integrally formed with the conductive plate.

According to various embodiments, the conductive member may extend toward the display to be higher than a surface of the conductive plate.

According to various embodiments, the side surface member of the housing and the conductive plate may be integrally formed with each other.

According to various embodiments, an electronic device may include: a housing including: a front surface plate; a rear surface plate spaced apart from the front surface plate opposite thereto; and a side surface member surrounding a space between the front surface plate and the rear surface plate having a rectangular shape, and including four side surfaces, at least one of a first nonconductive portion and a second nonconductive portion, and a conductive portion interposed between the first nonconductive portion and the second nonconductive portion on at least one of the four sides; at least one wireless communication circuit electrically connected to the conductive portion; a conductive intermediate plate which is disposed in the space substantially parallel with the front surface plate, wherein, the conductive intermediate plate includes a slot extending from the conductive portion, said slot having a longitudinal direction substantially perpendicular from the conductive portion; an FPCB which extends from the display, extends from a vicinity of the conductive portion of the side surface member in the longitudinal direction, and includes a portion interposed between the display and the conductive intermediate plate; and a conductive member attached to the conductive intermediate plate, or is formed between the conductive intermediate plate and the display to divide the slot into a plurality of portions.

According to various embodiments, the conductive member may be disposed on various positions of the slot where a length of a slot that is the closest to the conductive portion among the slots divided by the conductive member is within one-fourth and the wavelength of a frequency selected from the frequency range.

The present disclosure has been described with reference to various example embodiments thereof. It will be understood by a person skilled in the art that the present disclosure can be implemented in modified forms without departing from the essential characteristics of the present disclosure. Therefore, disclosed embodiments should be considered from a descriptive perspective, not from a limited perspective. The scope of the present disclosure is defined not by the detailed description but by the appended claims, and all differences within the scope should be understood as being included in the present disclosure.

What is claimed is:

1. An electronic device comprising:
   a housing comprising:
      a front surface plate;
      a rear surface plate spaced apart from the front surface plate opposite thereto; and
      a side surface member surrounding a space between the front surface plate and the rear surface plate, wherein at least a portion of the side surface member comprises at least one conductive portion disposed between a first nonconductive portion and a second nonconductive portion;
   a display exposed through the front surface plate;

at least one wireless communication circuit electrically connected to the at least one conductive portion;

a conductive plate disposed in the space, and comprising a slot having a longitudinal direction perpendicular to the at least one conductive portion, and wherein the conductive plate surrounds the slot;

a conductor disposed from a vicinity of the at least one conductive portion to a vicinity of the slot; and at least one conductive member dividing the slot into a plurality of portions.

2. The electronic device of claim 1, wherein, a longitudinal direction of the conductive member is perpendicular to the longitudinal direction of the slot.

3. The electronic device of claim 2, wherein the wireless communication circuit is configured to transmit and receive a signal within a frequency range in which the at least one conductive portion is used as an antenna.

4. The electronic device of claim 3, wherein the frequency range comprises a range from 700 MHz to 900 MHz.

5. The electronic device of claim 3, wherein the conductive member divides the slot into a first sub slot and a second sub slot.

6. The electronic device of claim 5, wherein the conductive member is disposed on various positions of the slot where a first length of the first sub slot is approximately $\lambda/4$, where $\lambda$ is a wavelength of a parasitic resonant frequency.

7. The electronic device of claim 1, further comprising a battery, wherein at least a portion of the battery is disposed between the slot and the rear surface plate.

8. The electronic device of claim 1, wherein the at least one conductive portion is configured to radiate in multiple frequency bands.

9. The electronic device of claim 8, wherein the conductive member is disposed on various positions of the slot where an electric length of the slot is within $\lambda/4$, wherein $\lambda$ is a wavelength of a highest frequency.

10. The electronic device of claim 1, wherein the conductor extends from the display, extends from the vicinity of the at least one conductive portion, and comprises an FPCB interposed between the display and the conductive plate.

11. The electronic device of claim 1, wherein the at least one conductive portion is configured to have different feeding positions according to different bands, and wherein the conductive member is disposed on various positions of the slot where a length of the slot is within approximately one-fourth of a wavelength of a frequency supported by each of the at least one conductive portion in a radiation direction from each different feeding position.

12. The electronic device of claim 11, wherein the conductive member is separately disposed on a position of the slot corresponding to each of the at least one conductive portion, or is integrally formed on positions of the slot corresponding to each at least one conductive portion.

13. The electronic device of claim 1, wherein at least one additional slot is further formed in a vicinity of the slot, and wherein the conductive member is individually disposed on various positions of the slot where a length of the slot is approximately one-fourth of a wavelength of a frequency supported by the at least one conductive portion, or is integrally formed at a position corresponding to each slot.

14. The electronic device of claim 1, wherein the display further comprises a conductive film disposed on a rear surface thereof, and wherein the conductive member is spaced to be close to the conductive film increasing a parasitic capacitance with the conductive film.

15. The electronic device of claim 14, wherein the conductive member is spaced apart from the conductive plate by a dielectric layer disposed on the conductive plate.

16. The electronic device of claim 1, wherein the conductive member is integrally formed with the conductive plate.

17. The electronic device of claim 1, wherein the side surface member of the housing and the conductive plate are integrally formed with each other.

18. An electronic device comprising:
a housing comprising:
    a front surface plate;
    a rear surface plate spaced apart from the front surface plate opposite thereto; and
    a side surface member surrounding a space between the front surface plate and the rear surface plate having a rectangular shape, and comprising four side surfaces, at least one of a first nonconductive portion and a second nonconductive portion, and a conductive portion interposed between the first nonconductive portion and the second nonconductive portion on at least one of the four sides;
a touch screen display exposed through the front surface plate;
at least one wireless communication circuit electrically connected to the conductive portion;
a conductive intermediate plate which is disposed in the space substantially parallel with the front surface plate, wherein, the conductive intermediate plate comprises a slot extending from the conductive portion, said slot having a longitudinal direction substantially perpendicular from the conductive portion;
an FPCB which extends from the display, extends from a vicinity of the conductive portion of the side surface member in the longitudinal direction, and comprises a portion interposed between the display and the conductive intermediate plate; and
a conductive member attached to the conductive intermediate plate, or is formed between the conductive intermediate plate and the display to divide the slot into a plurality of portions.

19. The electronic device of claim 18, wherein the conductive member is disposed on various positions of the slot where a length of a portion of the plurality of portions that is closest to the conductive portion is within one-fourth of a wavelength of a frequency.

20. The electronic device of claim 1, wherein the conductive member has a first end connected to the conductive plate at one point and another end connected to the conductive plate at another point, and has a middle portion between the one end and the another end, and wherein the middle portion covers a portion of the slot, conductive plate at another point, and has a middle portion between the one end and the another end, and wherein the middle portion covers a portion of the slot.

* * * * *